United States Patent
Jung et al.

(10) Patent No.: US 11,923,753 B2
(45) Date of Patent: Mar. 5, 2024

(54) ELECTRIC MOTOR

(71) Applicant: LG Electronics Inc., Seoul (KR)

(72) Inventors: Taeyong Jung, Seoul (KR); Jeongho Lee, Seoul (KR); Joongkeun Choi, Seoul (KR); Seongho Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 212 days.

(21) Appl. No.: 17/477,118

(22) Filed: Sep. 16, 2021

(65) Prior Publication Data
US 2022/0109349 A1 Apr. 7, 2022

(30) Foreign Application Priority Data
Oct. 5, 2020 (KR) .................. 10-2020-0128155

(51) Int. Cl.
| | |
|---|---|
| H02K 9/06 | (2006.01) |
| H02K 7/08 | (2006.01) |
| H02K 11/33 | (2016.01) |
| H02K 21/16 | (2006.01) |

(52) U.S. Cl.
CPC ............. *H02K 9/06* (2013.01); *H02K 7/083* (2013.01); *H02K 11/33* (2016.01); *H02K 21/16* (2013.01); *H02K 2211/03* (2013.01)

(58) Field of Classification Search
CPC .......... H02K 9/06; H02K 11/33; H02K 7/083; H02K 21/16; H02K 2211/03
USPC ................................ 310/58–59, 60 R, 63, 62
See application file for complete search history.

(56) References Cited

U.S. PATENT DOCUMENTS

| | | | |
|---|---|---|---|
| 2008/0278011 A1* | 11/2008 | Elgas | ............... H02K 5/203 310/52 |
| 2015/0244235 A1 | 8/2015 | Fujimoto et al. | |
| 2016/0037984 A1 | 2/2016 | Park et al. | |
| 2018/0160872 A1* | 6/2018 | Hayamitsu | ............... H02K 7/14 |
| 2018/0263446 A1 | 9/2018 | Hayamitsu | |
| 2018/0363664 A1* | 12/2018 | Daneshkhah | ............ H02K 9/06 |
| 2018/0363669 A1 | 12/2018 | Sullivan | |

FOREIGN PATENT DOCUMENTS

| | | | |
|---|---|---|---|
| CN | 103066753 A | * | 4/2013 |
| CN | 107959381 | | 4/2018 |
| DE | 3423319 | | 1/1986 |
| DE | 102015216226 | | 3/2017 |

(Continued)

OTHER PUBLICATIONS

Extended European Search Report in European Appln. No. 21194448.3, dated Jul. 1, 2022, 18 pages.

(Continued)

*Primary Examiner* — Jose A Gonzalez Quinones
(74) *Attorney, Agent, or Firm* — Fish & Richardson P.C.

(57) ABSTRACT

An electric motor includes a housing, a stator assembly disposed in the housing, a rotor assembly rotatably disposed in the stator assembly, and an impeller configured to be rotated by the rotor assembly and to generate a flow of air. The stator assembly defines an inner flow path configured to guide a part of the air to pass through an inside of the stator assembly. The housing defines a bypass flow path at an outside of the stator assembly, where the bypass flow path is configured to guide another part of the air to bypass the stator assembly.

20 Claims, 14 Drawing Sheets

(56) References Cited

FOREIGN PATENT DOCUMENTS

| EP | 0416468 | 3/1991 |
|----|---------|--------|
| EP | 2601730 | 7/2014 |
| FR | 3078844 | 9/2019 |
| JP | H0386037 | 4/1991 |
| JP | 2007113477 | 5/2007 |
| JP | 2016153636 | 8/2016 |
| JP | 2020143589 | 9/2020 |
| KR | 1019970014670 | 4/1997 |
| KR | 20150140200 | 12/2015 |
| KR | 102210012 | 2/2021 |
| TW | 202010225 | 3/2020 |
| WO | WO2018069030 | 4/2018 |
| WO | WO 2019/170490 | 9/2019 |
| WO | WO2020174878 | 9/2020 |
| WO | WO2021044115 | 3/2021 |

OTHER PUBLICATIONS

Office Action in Taiwanese Appln. No. 110132508, dated Dec. 8, 2022, 23 pages (with English translation).
EP Partial European Search Report in European Appln. No. 21194448.3, dated Feb. 17, 2022, 16 pages.

* cited by examiner

ELECTRIC MOTOR

CROSS-REFERENCE TO RELATED APPLICATION

Pursuant to 35 U.S.C. § 119(a), this application claims the benefit of the earlier filing date and the right of priority to Korean Patent Applications No. 10-2020-0128155, filed on Oct. 5, 2020, the contents of which are incorporated by reference herein in their entirety.

TECHNICAL FIELD

The present disclosure relates to a superfast small motor for driving a fan.

BACKGROUND

A motor (e.g., an electric motor) may be used in a home appliance such as a cleaner or a hair dryer. For example, a cleaner or a hair dryer may use a motor as a power source to rotate a fan so as to suction air containing dust or create a flow of air for drying hair. In some examples, a fan motor may be configured in combination of a fan and a motor, and the fan may receive power from the motor to generate an air flow.

A cleaner or a hair dryer may be used by a user while being held with a hand. In order to enhance user's portability and convenience, the size and weight of a cleaner or a hair dryer may be reduced. In some cases, in addition to the reduction of the size and weight of the motor, an output of the motor may be improved. For example, the motor may rotate at a high rotation speed.

In some examples, an electric device may include a stator assembly, a rotor assembly, and a supporter body. The stator assembly may be supported by an elongated central portion of the supporter body without a cylindrical housing. In some cases, the electric device may not include a housing surrounding the outside of the stator assembly, and air resistance due to friction between the air and the housing may be relatively low in which a relatively low flow resistance may be caused when air flows along a flow path passing through the motor.

In some examples, a motor may include a stator and a rotor assembly accommodated inside a housing. In some cases, this structure may narrow an inner flow path of the housing through which air can flow. When the air flows through the inside of the housing of the motor, flow resistance of the air may increase and a flow loss may occur.

In some examples, a compressor may have a flow guide in an air inlet. The compressor may include an impeller that is not disposed between a first bearing and a second bearing but is disposed at a downstream side of the second bearing. In some cases, the impeller may generate a larger rotational load on the second bearing compared to the first bearing, thereby reducing the lifespan of the second bearing. In some cases, the second bearing may be disposed at an upstream side of the second bearing, which may cause an increase in an amount of foreign substances introduced into the second bearing.

In some examples, an electric blower and an electric cleaner may include a motor but may not include a bypass flow path bypassing a stator inside a housing. When air passes through the stator, the air may move to a narrow space between stator coils wound on a stator core, and flow resistance may be increased accordingly. This may make it difficult to secure a sufficient suction flow rate by an impeller.

In some examples, a cleaner may include a motor assembly. The cleaner may include a stator assembly disposed at a downstream side of an impeller and a guide structure for introducing air into a stator, which may make a flow path structure complicated and cause a high flow resistance. In some cases, the temperature of air may be increased due to an impact of external air against the impeller. When the air with the increased temperature is introduced, a cooling performance of the stator may be impaired.

In some examples, a vacuum cleaner may include a fan motor. The fan motor may include a stator assembly disposed at a downstream side of an impeller. In some cases, when external air is suctioned by the impeller, a temperature of the air may increase due to collision with the impeller. Due to an introduction of such heated air, the stator may be deteriorated. The fan motor may include a guide structure for introducing air into the stator and a flow path curved from outside to inside of the stator, which may cause a high flow resistance.

SUMMARY

The present disclosure describes an electric motor having a structure that can minimize flow resistance of air flowing through the motor, where the electric motor can include a housing for accommodating a stator assembly and the like.

The present disclosure also describes an electric motor having a structure that can improve cooling performance. The present disclosure further describes an electric motor having a structure that can efficiently support the motor while including a bypass flow path. The present disclosure further describes an electric motor having a structure that can optimize uniform flow distribution of a bypass flow path. The present disclosure further describes an electric motor having a structure that can simplify a structure of a member for achieving those aspects. The present disclosure further describes an electric motor having a structure that can be applied to other types of motors while achieving those aspects.

In some implementations, an electric motor can include a bypass flow path defined in a housing to bypass a flow path passing through an inside of the electric motor, so that air can be guided to flow in the bypass flow path with small flow resistance. In some implementations, an electric motor can include a bypass flow path between a housing and a stator, so that air passing through the electric motor can be brought into contact with an outer surface of the stator, thereby increasing a cooling area of the stator to be cooled by the air.

In some implementations, the electric motor can include support portions that are spaced apart in a circumferential direction of a stator core and support an outer surface of the stator core at three points, thereby stably supporting the stator with a minimum size. In some implementations, the electric motor can include a plurality of bypass flow paths that are spaced apart from one another at equal intervals along an inner circumferential surface of a housing, so that a flow rate of air bypassed can be equally distributed by the bypass flow paths.

In some implementations, the electric motor can include a plurality of bypass flow paths that surround a stator, where an inner surface of a housing can be recessed in a thickness direction to define the bypass flow paths, which can result in simplifying a structure. In some implementations, the electric motor can include a plurality of bypass flow paths that are configured such that not only air but also other fluids such as cooling water can flow therethrough, thereby being applicable to other types of motors for cooling as well as a fan motor.

According to one aspect of the subject matter described in this application, an electric motor includes a housing, a stator assembly disposed in the housing, a rotor assembly rotatably disposed in the stator assembly, and an impeller configured to be rotated by the rotor assembly and to generate a flow of air. The stator assembly defines an inner flow path configured to guide a part of the air to pass through an inside of the stator assembly. The housing defines a bypass flow path at an outside of the stator assembly, where the bypass flow path is configured to guide another part of the air to bypass the stator assembly.

Implementations according to this aspect can include one or more of the following features. For example, the bypass flow path can be defined along an inner circumferential surface of the housing and extend radially outward relative to the inner flow path, where the bypass flow path is defined at an outer side of the inner flow path. In some examples, the bypass flow path can be defined at an upstream side relative to the impeller in a flowing direction of the air.

In some implementations, the electric motor can include a supporting portion that is disposed inside the housing and supports the stator assembly. In some implementations, the electric motor can include a plurality of supporting portions that protrude radially inward from an inner circumferential surface of the housing and support an outer circumferential surface of the stator assembly. The bypass flow path can extend between the plurality of supporting portions in a circumferential direction of the housing and pass through the housing in an axial direction of the housing.

In some implementations, the electric motor can include a supporting rib that extends in the circumferential direction and surrounds the outer circumferential surface of the stator assembly, where the supporting rib connects the plurality of supporting portions to one another. The bypass flow path can be defined between the inner circumferential surface of the housing and an outer circumferential surface of the supporting rib.

In some examples, the bypass flow path can have a ring shape, an arcuate shape, or a polygonal shape. In some examples, the bypass flow path can be one of a plurality of bypass flow paths that are defined inside the housing and that are spaced apart from one another by equal intervals in the circumferential direction of the housing. In some examples, a circumferential length of one of the plurality of bypass flow paths is greater than (i) a radial width of the one of the plurality of bypass flow paths and (ii) a circumferential length of one of the plurality of supporting portions.

In some implementations, the housing can include a first accommodating part that accommodates the rotor assembly and the stator assembly and a second accommodating part that accommodates the impeller. The second accommodating part can be disposed at a downstream side relative to the first accommodating part in a flowing direction of the air, and the bypass flow path can be defined between an inner circumferential surface of the first accommodating part and an outer circumferential surface of the stator assembly.

In some implementations, the housing can include a first accommodating part that accommodates the rotor assembly and the stator assembly, a second accommodating part that accommodates the impeller and is disposed at a downstream side relative to the first accommodating part in a flowing direction of the air, a neck part disposed between the first accommodating part and the second accommodating part, where a diameter of the neck part is less than a diameter of the first accommodating part, and an inclined part that is inclined with respect to an axial direction of the housing and extends from the first accommodating part to the neck part. The bypass flow path can be defined between an inner circumferential surface of the first accommodating part and an outer circumferential surface of the stator assembly.

In some implementations, the rotor assembly can include a rotating shaft rotatably disposed at a central portion of the housing, a permanent magnet disposed at the rotating shaft, a first bearing that supports a first end portion of the rotating shaft, and a second bearing that supports a second end portion of the rotating shaft. The impeller can be rotatably coupled to the rotating shaft and cover the second bearing, where the impeller is disposed at a downstream side relative to the permanent magnet in a flowing direction of the air. The rotating shaft can include an impeller mounting portion that supports the impeller and that is disposed between the first bearing and the second bearing.

In some implementations, the housing can include a first accommodating part that accommodates the rotor assembly and the stator assembly, a second accommodating part that accommodates the impeller and is disposed at a downstream side relative to the first accommodating part in a flowing direction of the air, and an intake part disposed at an upstream side relative to the first accommodating part in the flowing direction of the air, where the intake part defines a plurality of side holes that are in fluid communication with an outside of the housing and that are configured to introduce the air from the outside of the housing into the stator assembly. The bypass flow path can be in fluid communication with the plurality of side holes.

In some implementations, the stator assembly can include a back yoke that has a circular ring shape and is disposed between the bypass flow path and the inner flow path, a plurality of teeth disposed at an inner circumferential surface of the back yoke, and a plurality of stator coils wound around the plurality of teeth, respectively. The inner flow path can extend through an inside of the back yoke in an axial direction, and the bypass flow path can be defined between an inner circumferential surface of the housing and an outer circumferential surface of the back yoke, where the bypass flow path extends in the axial direction.

In some implementations, the electric motor can include a first bearing and a second bearing that are spaced apart from each other, where the impeller is disposed between the first bearing and the second bearing, a first housing cover that is disposed at a first side of the housing and accommodates the first bearing therein, and a second housing cover that is disposed at a second side of the housing and accommodates the second bearing. In some examples, the first housing cover can include an outer ring portion, a first bearing accommodating portion that is disposed at an inner central portion of the outer ring portion and accommodates the first bearing, and a plurality of connecting portions that connect the outer ring portion to the first bearing accommodating portion.

The plurality of connecting portions can extend radially from an inner circumferential surface of the outer ring portion to an outer circumferential surface of the first bearing accommodating portion. The plurality of connecting portions can be spaced apart from one another in a circumferential direction and define a plurality of axial through-holes therebetween, where the plurality of axial through-holes extend in an axial direction. The bypass flow path can overlap with the plurality of axial through-holes along the axial direction and be in fluid communication with the plurality of axial through-holes in the axial direction.

In some examples, the second housing cover can include an outer cover, a first inner hub disposed inside the outer cover, a second bearing accommodating portion that protrudes from a first side of the first inner hub toward the impeller and accommodates the second bearing, and a plurality of first vanes that connect the first inner hub to the outer cover. The plurality of first vanes spirally protrude from an outer circumferential surface of the first inner hub to an inner circumferential surface of the outer cover. In some examples, the second housing cover can further include a second inner hub accommodated inside the outer cover, where the first inner hub and the second inner hub are arranged along an axial direction, and a plurality of second vanes that protrude spirally from an outer circumferential surface of the second inner hub toward the inner circumferential surface of the outer cover.

In some implementations, the housing can include a first flange that protrudes outward from the second side of the housing in a radial direction, and a second flange that protrudes outward from a side of the second housing cover in the radial direction, where the side of the second housing cover faces the second side of the housing in an axial direction. The first flange can overlap with the second flange along the axial direction and be coupled to the second flange.

In some implementations, the electric motor can include an inverter configured to control a speed of the electric motor. For example, the inverter can include an insulated-gate bipolar transistor (IGBT), a capacitor, and a Printed Circuit Board (PCB) that supports the IGBT and the capacitor thereon and is spaced apart from the first housing cover in the axial direction, where the first housing cover includes a plurality of first coupling portions that protrude from the outer ring portion toward the PCB. The inverter can further include a plurality of second coupling portions that protrude from an edge portion of the PCB toward the plurality of first coupling portions, respectively, where each of the plurality of second coupling portions is coupled to one of the plurality of first coupling portions. The PCB and the first housing cover can define a plurality of lateral flow paths therebetween, where the plurality of lateral flow paths are defined between the plurality of second coupling portions and configured to introduce the air in a radial direction. The plurality of lateral flow paths can be in fluid communication with the plurality of axial through-holes.

In some implementations, most of air flowing into the housing from the outside of the housing can move through the bypass flow path rather than the inner flow path having high flow resistance, thereby minimizing flow resistance and flow loss.

In some implementations, cold air can first flow along the stator assembly from the outside of the housing, and then pass through the impeller, which can result in improving cooling performance of the stator assembly.

In some implementations, air that has passed through the bypass flow path can merge with air that has passed through the inner flow path at the inclined part.

In some implementations, the plurality of first vanes can be an axial flow type. The first inner hub can be formed in a cylindrical shape. In some implementations, the plurality of second vanes can be an axial flow type. The second inner hub can be formed in a cylindrical shape.

In some examples, where the first and second vanes are axial flow types, those vanes can be easily made through injection molding. In addition, flow resistance can be reduced as air flows along the axial vanes.

In some implementations, external air of the housing can be introduced into the PCB through the lateral flow paths to cool semiconductor devices such as the IGBT and the capacitor.

In some implementations, bypass flow paths for bypassing a stator assembly can further be provided inside a housing, thereby minimizing flow resistance and flow loss of air. In some examples, since the plurality of bypass flow paths expand a movement area of air, the flow resistance and flow loss of the air can be reduced, compared to the case where only inner flow paths of the stator assembly are provided as a flow path penetrating through the housing.

Bypass flow paths can have much lower flow resistance and flow loss than those in inner flow paths penetrating through a stator assembly. Therefore, even if a cross-sectional area of the bypass flow paths is smaller than that of the inner flow paths of a back yoke, more air can flow into the bypass flow paths with the lower resistance.

Accordingly, the bypass flow paths can secure a greater flow rate of air, thereby improving cooling performance of stator coils and the like.

Although the bypass flow paths have a very small cross-sectional area, the great effect of reducing the flow resistance and the flow loss can be provided. This can allow high cooling performance to be secured by the bypass flow paths with the small cross-sectional area.

In some implementations, a plurality of supporting portions that partially or entirely surround a stator core can be disposed at an inner side of a housing. Accordingly, a motor can be efficiently supported even if the supporting portions are small in size.

In some implementations, a plurality of bypass flow paths can be spaced apart from a plurality of supporting portions at equal intervals in a circumferential direction, so as to evenly distribute a flow rate of air bypassing a stator assembly.

In some implementations, a plurality of bypass flow paths and a plurality of supporting portions can be alternately disposed between an inner surface of a housing and an outer circumferential surface of a stator core, which can result in simplifying a flow path configuration of a motor even if the bypass flow paths are included in the housing.

In some implementations, bypass flow paths can be formed inside the housing, separately from inner flow paths of a stator assembly. Those aforementioned effects can be achieved even by forming the bypass flow paths inside a motor housing of a vacuum cleaner, an air dryer, or the like.

Accordingly, the general purpose of the housing including the bypass flow paths can be improved. In addition, a user can apply a motor having a structure, which merely further includes bypass flow paths, to a motor of an existing cleaner or air dryer, even without using a separate motor cooling device.

Accordingly, the performance and durability of the motor can be improved.

DETAILED DESCRIPTION

Figure 1:
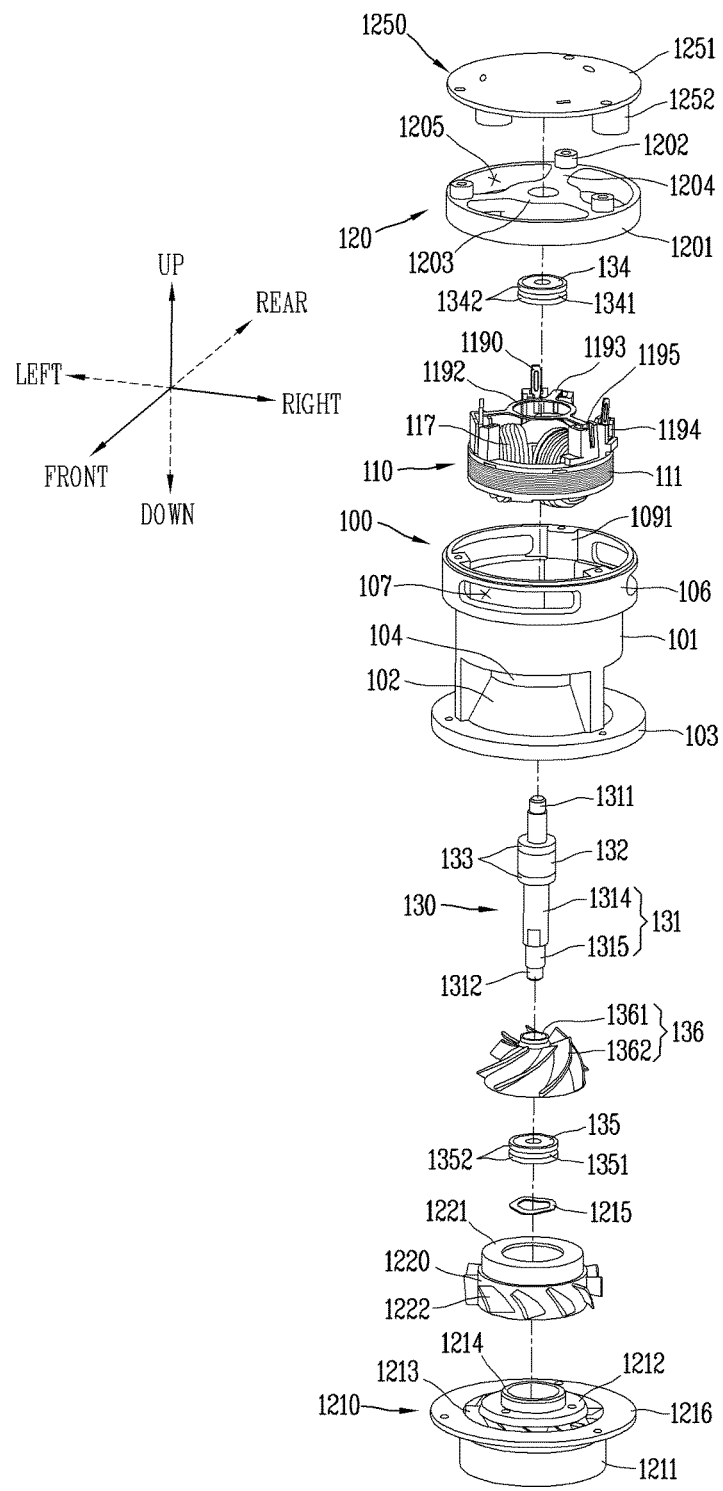
FIG. 1 is an exploded perspective view illustrating an exploded state of an example of an electric motor.
Figure 2:
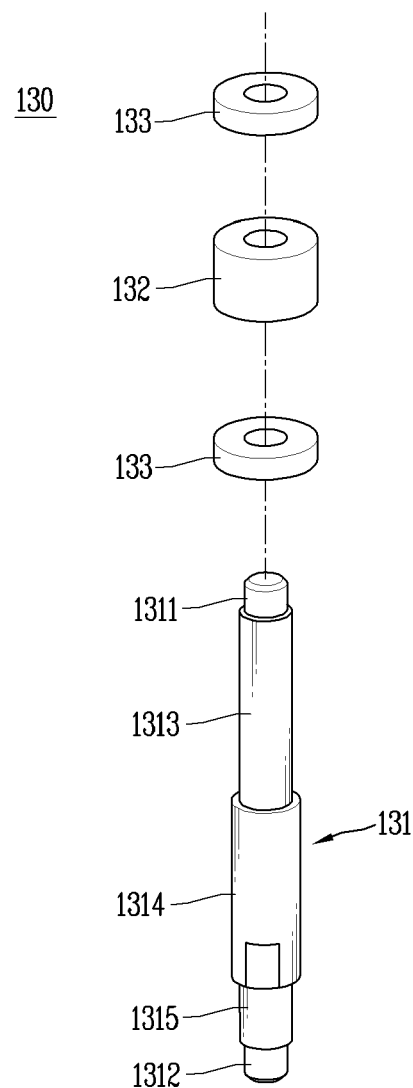
FIG. 2 is an exploded perspective view illustrating an exploded state of an example of a rotor assembly of FIG. 1.
Figure 3:
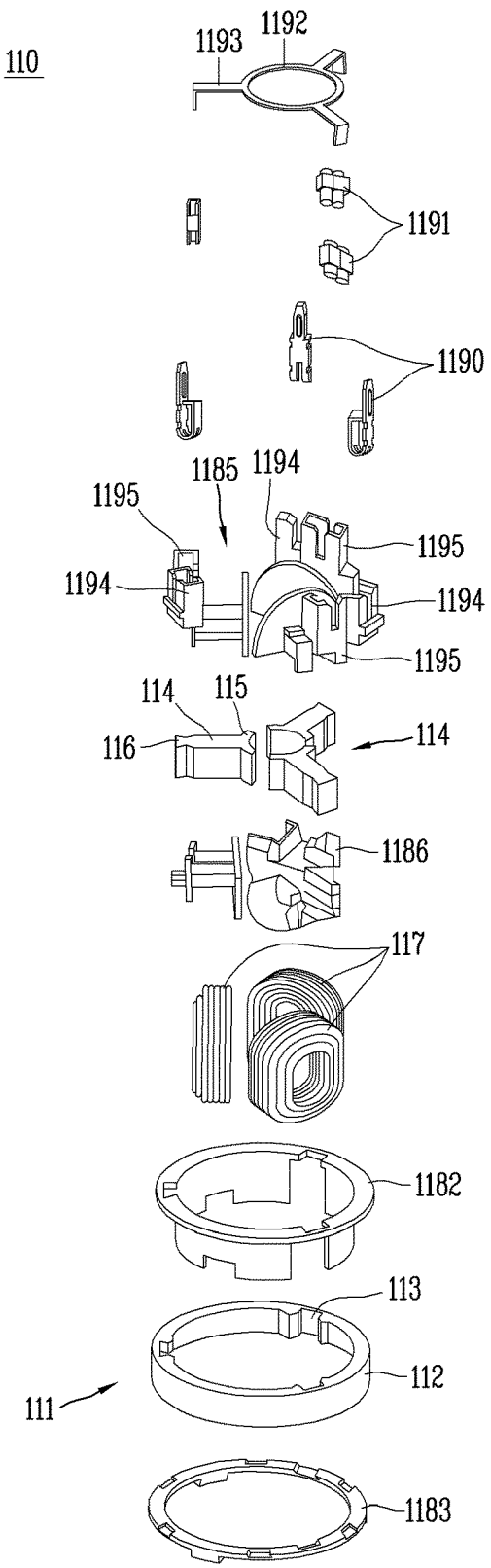
FIG. 3 is an exploded perspective view illustrating an exploded state of an example of a stator assembly of FIG. 1.
Figure 4:
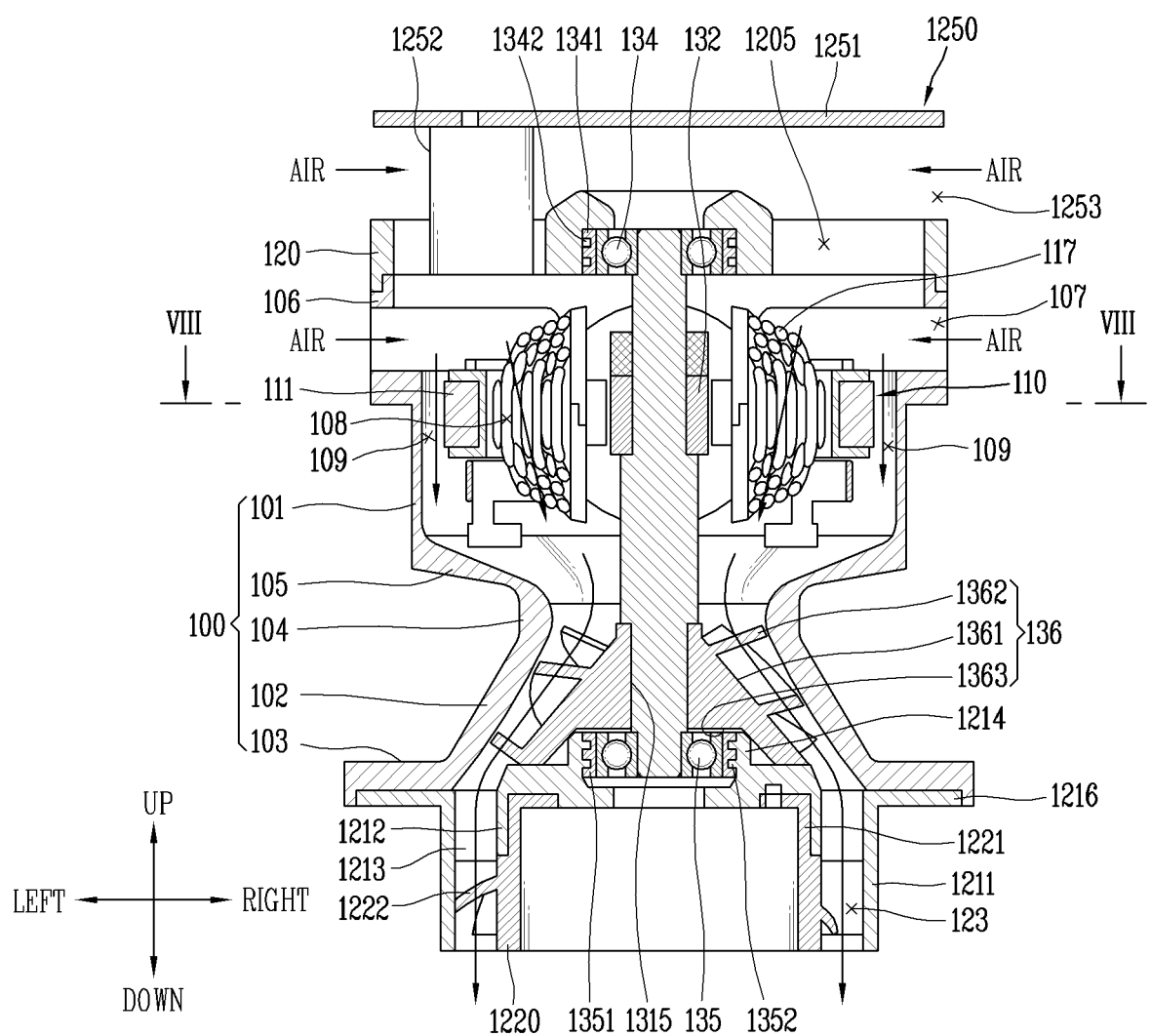
FIG. 4 is a cross-sectional view illustrating a coupled state of example components of the electric motor of FIG. 1.
Figure 5:
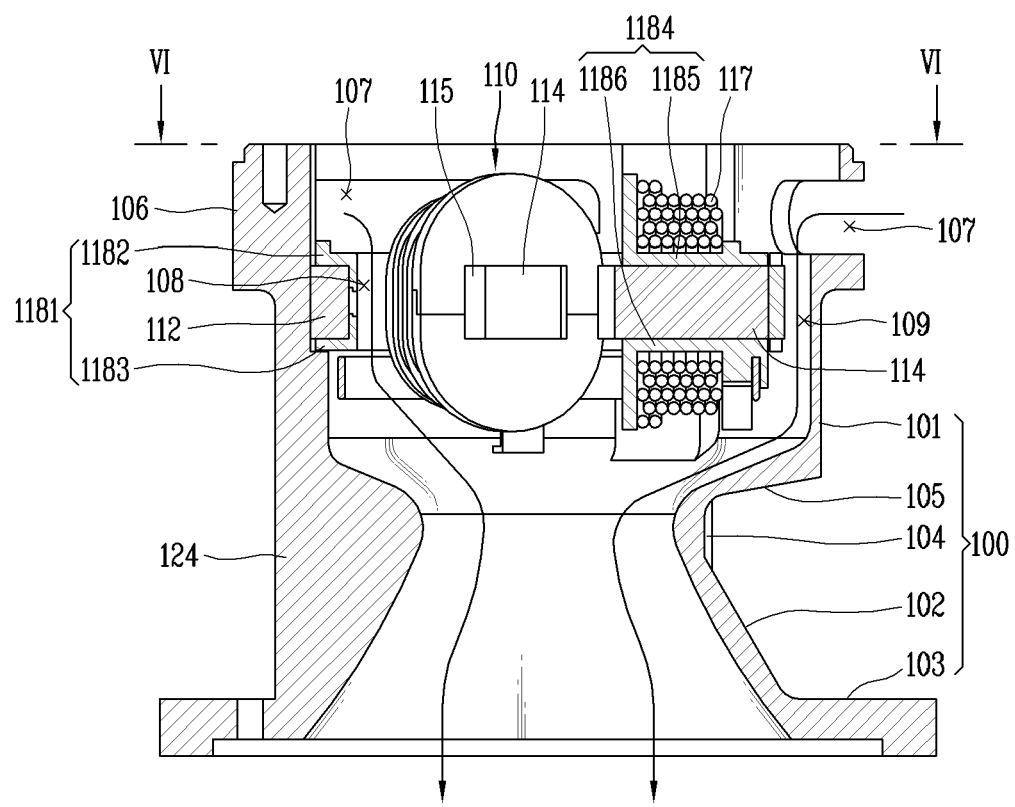
FIG. 5 is a conceptual view illustrating an example of a stator assembly accommodated in a housing in FIG. 4.
Figure 6:
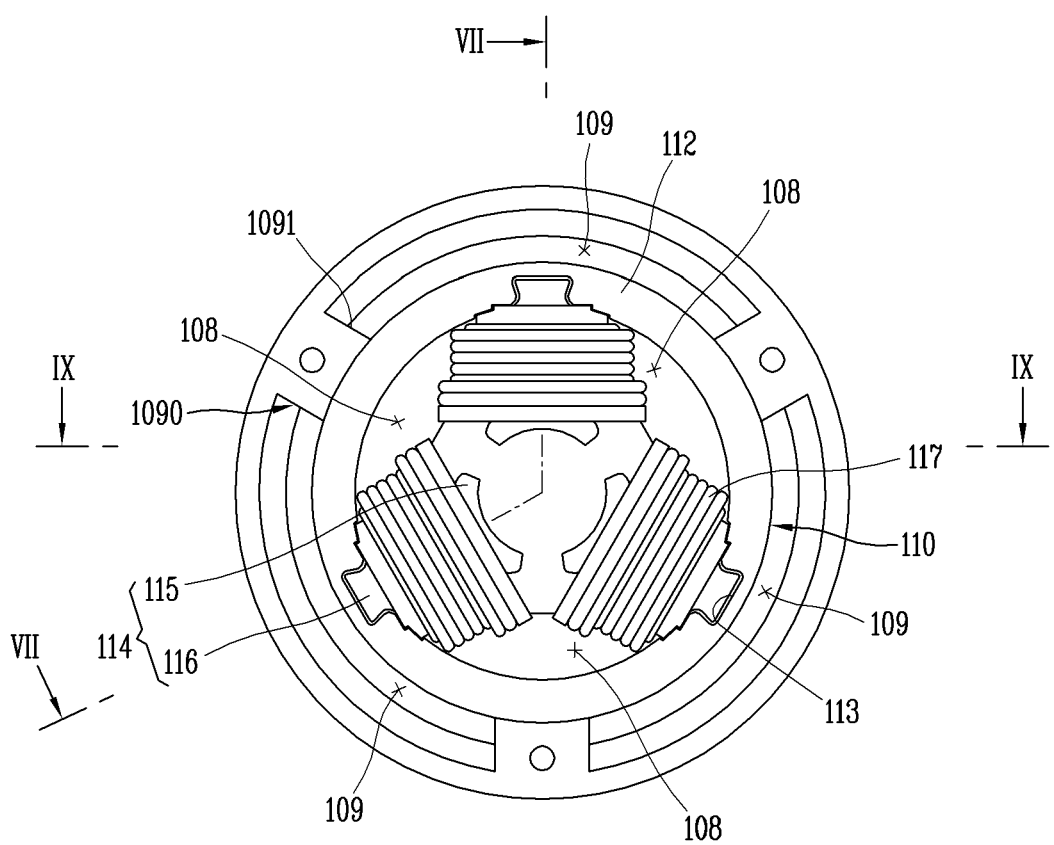
FIG. 6 is a planar view illustrating the stator assembly supported by an example of a support portion of the housing, taken along the line VI-VI in FIG. 5.
Figure 7:
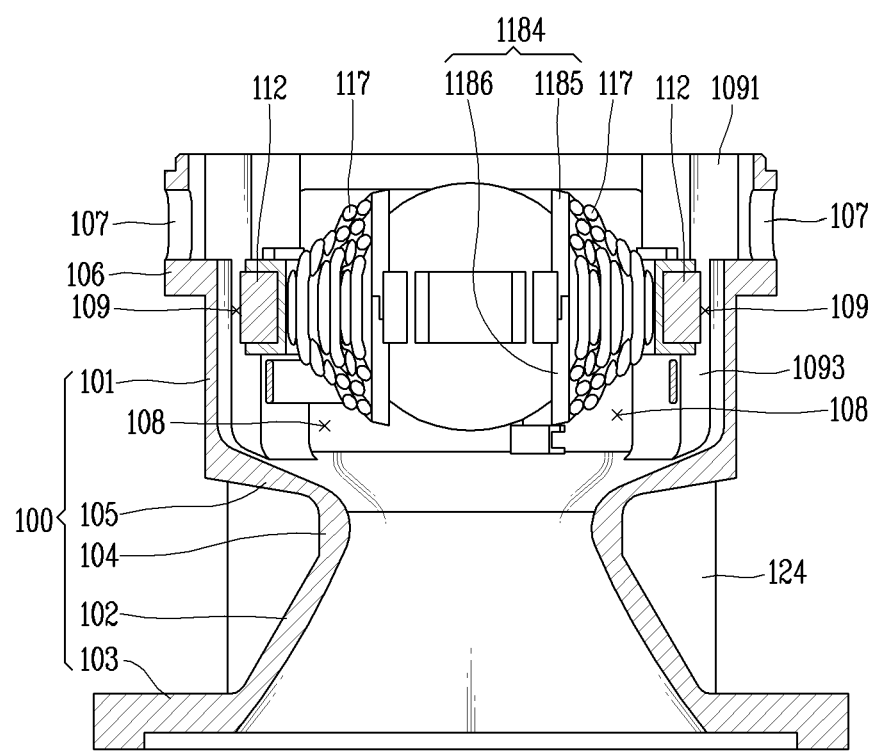
FIG. 7 is a cross-sectional view illustrating an example of a bypass flow path defined between the housing and a stator, taken along the line VII-VII of FIG. 6.
Figure 8:
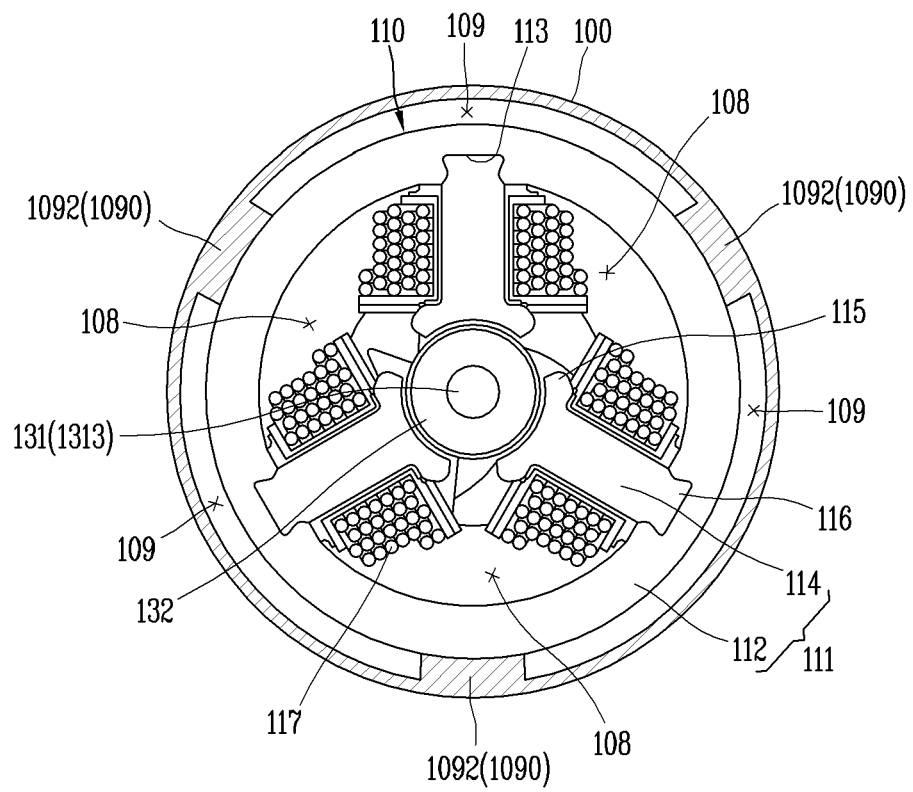
FIG. 8 is a cross-sectional view illustrating the stator assembly partially supported at an inner side of the housing, taken along the line VIII-VIII of FIG. 4.
Figure 9:
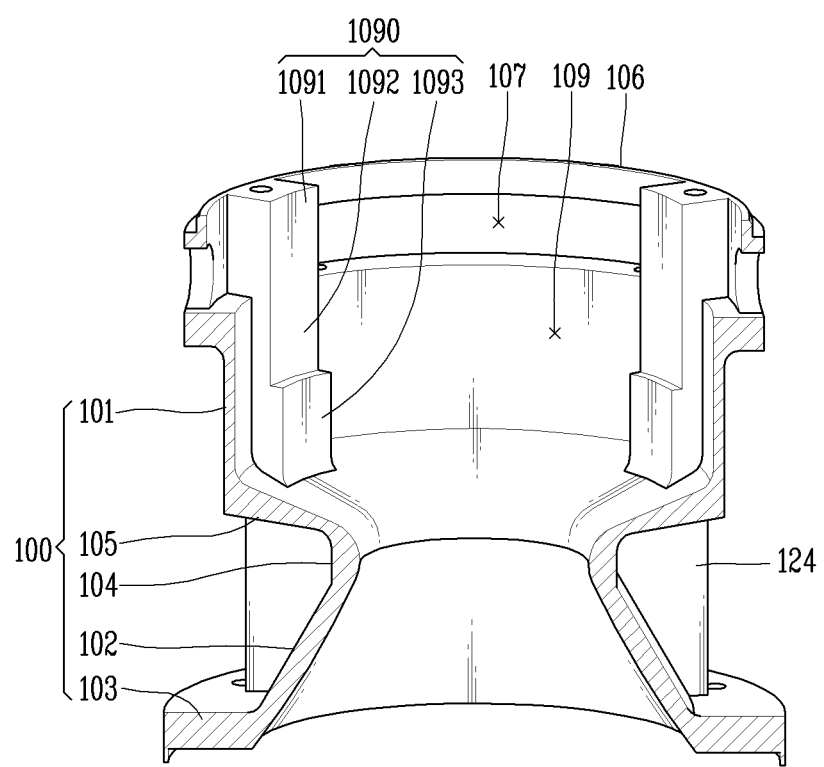
FIG. 9 is a cross-sectional view illustrating an example of an internal structure of the housing with the stator assembly being removed, taken along the line IX-IX in FIG. 6.

Hereinafter, one or more examples of an electric motor will be described in detail with reference to the accompanying drawings.

In the following description, in order to clarify the characteristics of the present disclosure, descriptions of some components can be omitted.

The term "motor" used in the following description refers to a device, namely, an electric motor that receives energy such as electricity and converts it into a mechanical motion.

The term "fan motor" used in the following description refers to a motor that generates an airflow by turning a fan.

As used in the following description, the term "fan" refers to a rotating blade configured to form a flow of air.

The term "motor" used in the following description can be understood as a concept including a fan motor.

A "motor" used in the following description can provide power for a vacuum cleaner to suction air, or for a hair dryer to send air to a specific location.

In the following description, an upper portion or an upper side (UP; see FIGS. 1 to 4) can refer to a top in an up and down (vertical) direction, and a lower portion or a lower side (DOWN; see FIGS. 1 to 4) can refer to a bottom in the vertical direction. The vertical direction can be oriented to be parallel to or equal to an axial direction of a rotating shaft or a lengthwise direction of a first accommodating part.

In this specification, a radial direction can include a front and rear (or back and forth) direction (FRONT/REAR; see FIGS. 1 to 4) and a left and right direction (LEFT/RIGHT; see FIGS. 1 to 4).

Hereinafter, one or more examples of an electric motor will be described with reference to the accompanying drawings.

Referring to FIGS. 1 to 9, in some implementations, an electric motor can include a housing 100, a stator assembly 110, a rotor assembly 130, an impeller 136, vanes 1213 and 1222, bearings 134 and 135, and housing covers 120 and 1210.

The housing 100 can define appearance of the electric motor. An inverter 1250 can be disposed at an upper side of the housing 100.

The inverter 1250 can include a printed circuit board (PCB) 1251, and semiconductor devices such as an IGBT, a capacitor, and the like. The inverter 1250 can control the speed of the motor. The semiconductor devices can be mounted on the PCB 1251.

A part or portion of the housing 100 can be formed in a cylindrical shape. Another part of the housing 100 can be formed in a conical shape.

The housing 100 can include a first accommodating part 101, a second accommodating part 102, and a neck part 104.

The first accommodating part 101 can be disposed in an upper portion of the housing 100. The first accommodating part 101 can be formed in a cylindrical shape.

A center of the housing 100 can be disposed to correspond to a center of the rotating shaft 131.

The first accommodating part 101 can have an accommodation space therein to accommodate the rotor assembly 130 and the stator assembly 110.

The first accommodating part 101 can be formed such that its diameter is kept constant in the vertical direction.

The first accommodating part 101 can be formed such that its cross-sectional area in the radial direction is constantly maintained.

An intake part 106 can be disposed on an upper portion of the first accommodating part 101. The intake part 106 can be integrally formed on the upper portion of the first accommodating part 101.

The intake part 106 can be configured to suction air into the housing 100. The intake part 106 can be connected to communicate with the outside of the housing 100.

The intake part 106 can be formed in a circular ring shape. The intake part 106 can have a diameter larger than that of the first accommodating part 101. A stepped portion can extend outward in the radial direction from an upper end of the first accommodating part 101 to have a larger diameter, so as to be connected to a lower end of the intake part 106.

The intake part 106 can include a plurality of side holes 107.

The plurality of side holes 107 can be formed through a circumferential surface of the intake part 106 in the radial direction. The plurality of side holes 107 can be disposed to be spaced apart from one another in a circumferential direction of the intake part 106.

The plurality of side holes 107 can extend long along the circumferential direction of the intake part 106. Each of the plurality of side holes 107 can be formed such that a circumferential length is longer than a vertical height.

The plurality of side holes 107 can be spaced apart from one another at equal intervals in the circumferential direction of the intake part 106. A distance between adjacent side holes 107 can be shorter than a length of the side hole 107.

The side hole 107 can be formed in a rectangular shape when viewed from an outer side of the housing 100 in the radial direction. Each vertex portion of the side hole 107 can be rounded into a curved shape.

The intake part 106 can be formed in a penetrating manner in the vertical direction.

With the configuration, air can move radially through the plurality of side holes 107 from the outside of the housing 100 to be introduced into the housing 100.

In addition, the air can be introduced into the housing 100 in the axial direction from the upper portion of the intake part 106.

The housing covers 120 and 1210 can be provided on upper and lower portions of the housing 100, respectively.

The housing covers 120 and 1210 can include a first housing cover 120 and a second housing cover 1210.

The first housing cover 120 can be disposed on the upper portion of the housing 100.

The first housing cover 120 can be mounted on the upper portion of the intake part 106.

The first housing cover 120 can be formed in a circular ring shape.

The first housing cover 120 can include an outer ring portion 1201, a first bearing accommodating portion 1203, and a connecting portion 1204.

The outer ring portion 1201 can define an outermost side surface of the first housing cover 120. The outer ring portion 1201 can be formed such that a height is relatively smaller than a diameter.

The first bearing accommodating portion 1203 can be disposed at a central part of the outer ring portion 1201. The first bearing accommodating portion 1203 can be formed in a cylindrical shape. The first bearing accommodating portion 1203 can have an accommodation space to accommodate a first bearing 134.

The first bearing accommodating portion 1203 can have a height (thickness) that is the same as the height of the outer ring portion 1201. A through-hole can be formed through an upper portion of the first bearing accommodating portion 1203. The first bearing accommodating portion 1203 can surround an outer circumferential surface of the first bearing 134.

The first bearing 134 can be implemented as a ball bearing. A first holder 1341 can be coupled to the outer circumferential surface of the first bearing 134 so as to surround the first bearing 134. The first holder 1341 can be formed in a circular ring shape.

A first O-ring 1342 can be installed on an outer circumferential surface of the first holder 1341. The first O-ring 1342 can be provided by one or in plurality.

The first O-rings 1342 can be disposed in a spaced manner along a lengthwise direction of the first holder 1341. A first O-ring mounting groove can be formed in the outer circumferential surface of the first holder 1341. The first O-ring 1342 can be fixedly inserted into the first O-ring mounting groove.

The first O-ring 1342 can be disposed in close contact between an inner circumferential surface of the first bearing accommodating portion 1203 and the outer circumferential surface of the first holder 1341.

The first O-ring 1342 can have a circular cross-sectional shape. At least a portion of the circular cross-section of the first O-ring 1342 can protrude from the first O-ring mounting groove to be in close contact with the inner circumferential surface of the first bearing accommodating portion 1203.

The first O-ring 1342 can be made of a rubber material having elasticity.

In some implementations, the first O-ring 1342 can adjust concentricity of the two bearings 134 and 135 supporting both ends of the rotating shaft 131, together with a second O-ring to be explained later. The first O-ring 1342 and the second O-ring can extend the lifespan of the bearings 134 and 135.

The first O-ring 1342 can provide an attenuating effect of absorbing vibration transferred from the bearing 134 during the rotation of the rotating shaft 131 and mitigating an impact.

The first bearing accommodating portion 1203 can have a diameter that is smaller than the diameter of the outer ring portion 1201.

A plurality of connecting portions 1204 can be provided between the outer ring portion 1201 and the first bearing accommodating portion 1203.

The connecting portions 1204 can extend in the radial direction between the outer ring portion 1201 and the first bearing accommodating portion 1203, so as to connect the outer ring portion 1201 and the first bearing accommodating portion 1203.

The connecting portion 1204 can have a rectangular cross-sectional shape.

The plurality of connecting portions 1204 can be disposed to be spaced apart from one another at equal intervals along the circumferential direction of the outer ring portion 1201. This disclosure exemplarily illustrates three connecting portions 1204.

The first housing cover 120 can include a plurality of axial through-holes 1205. The plurality of axial through-holes 1205 can be formed in a penetrating manner between the adjacent connecting portions 1204 in the axial direction (or in the vertical direction).

External air of the housing 100 can be introduced into the housing 100 through the plurality of axial through-holes 1205.

A plurality of first coupling portions 1202 can protrude upward from an upper portion of the outer ring portion 1201. The first coupling portions 1202 can be disposed on extension lines of the connecting portions 1204, respectively. The first coupling portions 1202 can protrude in a cylindrical shape.

The PCB 1251 can have a disk shape. The PCB 1251 can be axially spaced apart from the first housing cover 120. The PCB 1251 can be disposed to overlap the first housing cover 120 in the axial direction.

A plurality of second coupling portions 1252 can protrude downward from a lower surface of the PCB 1251.

The second coupling portions 1252 can surround and accommodate the first coupling portions 1202, respectively. The second coupling portion 1252 can be formed in a cylindrical shape having a larger diameter than the first coupling portion 1202.

The second coupling portion 1252 can extend such that its height in the axial direction or the vertical direction is higher than the height of the first coupling portion 1202.

The plurality of first and second coupling portions 1202 and 1252 can be disposed to be spaced apart from one another at equal intervals in the circumferential direction of the PCB 1251.

In some implementations, the first coupling portion 1202 and the second coupling portion 1252 can form a pair to be fitted to each other, so that the PCB 1251 can be coupled to the first housing cover 120.

In addition, a plurality of lateral flow paths 1253 can be defined between the first housing cover 120 and the PCB 1251.

The plurality of lateral flow paths 1253 (refer to FIG. 4) can be defined through between the plurality of first and second coupling portions 1202 and 1252 in the radial direction. The height of the plurality of lateral flow paths 1253 can be defined by the heights of the first and second coupling portions 1202 and 1252. The plurality of lateral flow paths 1253 can be defined by the distances between the plurality of first and second coupling portions 1202 and 1252.

The plurality of lateral flow paths 1253 can be disposed at the upper portion of the plurality of side holes 107.

The lateral flow paths 1253 and the side holes 107 can overlap each other, respectively, in the vertical direction or the axial direction. In the specification, the vertical (up and down) direction can be understood as the same direction as the axial direction.

The lateral flow paths 1253 and the side holes 107 can be connected to communicate with the axial through-holes 1205 of the first housing cover 120, respectively.

The lateral flow paths 1253 and the side holes 107 can be formed such that their circumferential lengths extend at the same angle.

A circumferential length of an outermost portion of the axial through-hole 1205 can be formed to correspond to the circumferential length of the lateral flow path 1253 and the side hole 107 at the same angle.

This disclosure exemplarily illustrates that each of the side hole 107, the axial through-hole 1205, and the lateral flow path 1253 are provided by three in number.

Three lateral flow paths 1253 and three side holes 107 can be disposed on the upper portion and the lower portion of the first housing cover 120, respectively.

With the configuration, external air of the housing 100 can be introduced into the lower surface of the PCB 1251 through the three lateral flow paths 1253 to cool the semiconductor devices (e.g., IGBT, capacitor, etc.) of the inverter 1250, and then can flow into the housing 100 through the three axial through-holes 1205 of the first housing cover 120.

In addition, the external air of the housing 100 can be introduced into an inner space of the intake part 106 through the three side holes 107 to cool the stator assembly 110.

The air introduced into the inner space of the intake part 106 through the side holes 107 can merge with the air that has passed through the axial through-holes 1205.

As such, the air introduced through the lateral flow paths 1253 and the air introduced through the side holes 107 can move along an inner flow path of the housing 100 and pass through the housing 100 in the axial direction.

The neck part 104 can be disposed between the first accommodating part 101 and the second accommodating part 102. The neck part 104 can have a diameter smaller than that of the first accommodating part 101.

An inclined part 105 can be provided between a lower end of the first accommodating part 101 and the neck part 104.

The inclined part 105 can be formed such that its diameter gradually decreases from the first accommodating part 101 to the neck part 104.

The inclined part 105 can extend from the lower end of the first accommodating part 101 in the circumferential direction.

The inclined part 105 can be inclined downward from the lower end of the first accommodating part 101 toward the neck part 104.

The inclined part 105 can be disposed in a central portion of the housing 100 in the lengthwise direction of the housing 100.

Outer and inner surfaces of the inclined part 105 can be inclined at different inclinations.

The inner surface of the inclined part 105 can have a relatively greater inclination than the outer surface of the inclined part 105.

An inner portion where the first accommodating part 101 and the inclined part 105 are connected to each other can be rounded into a curved shape.

With the configuration, flow resistance of air that moves from the first accommodating part 101 to the inclined part 105 can be minimized.

The inner surface of the neck part 104 can be rounded into a curved shape.

The neck part 104 can have a curvature smaller than a curvature of a connected portion between the first accommodating part 101 and the inclined part 105.

With the configuration, the inner surface of the neck part 104 can be formed in the curved shape, thereby minimizing air flow resistance when the air passes through the neck part 104 from the first accommodating part 101 and the second accommodating part 102.

The neck part 104 can be connected to an upper end portion of the second accommodating part 102. The neck part 104 can be a portion having the smallest diameter among diameters of the inner flow path passing through the inner side of the housing 100.

The second accommodating part 102 can be formed in a conical shape. The second accommodating part 102 can be formed such that its diameter gradually increases from the top to the bottom. The upper end of the second accommodating part 102 can have a diameter that is smaller than that of the lower end of the second accommodating part 102.

A first flange 103 can be provided on a lower end portion of the second accommodating part 102. The first flange 103 can be formed in a ring shape. The first flange 103 can extend radially outward from the lower end of the second accommodating part 102. The first flange 103 can be formed on the lower end of the second accommodating part 102 in the circumferential direction.

The second accommodating part 102 can accommodate the impeller 136.

The impeller 136 can transmit rotational force received from the electric motor to a fluid, that is, air to rotate the air.

The impeller 136 can be mounted on one side of the rotating shaft 131 so as to rotate together with the rotating shaft 131.

The impeller 136 can generate an airflow by receiving power from the electric motor through the rotating shaft 131. The impeller 136 can allow air introduced into the first accommodating part 101 to be suctioned into the second accommodating part 102.

The impeller 136 can be configured as a diagonal flow type impeller.

The impeller 136 can include a hub 1361 and a plurality of blades 1362.

For the diagonal flow type impeller 136, the hub 1361 can be formed in a conical shape. The hub 1361 can have an outer surface inclined at a preset angle so that its diameter increases from the top to the bottom.

A shaft coupling portion can be formed in the hub 1361. The shaft coupling portion can be formed in a cylindrical shape through the hub 1361 in the axial direction.

One side of the rotating shaft 131 can be inserted into the shaft coupling portion, and the impeller 136 can rotate together with the rotating shaft 131.

The plurality of blades 1362 can protrude from an outer surface of the hub 1361 toward the inner surface of the second accommodating part 102. The plurality of blades 1362 can extend spirally from the outer surface of the hub 1361 at a preset wrap angle.

The wrap angle can refer to an angle of a length by which the blade 1362 extends from the outer surface of the hub 1361 in the circumferential direction.

As the wrap angle of the blade 1362 is smaller, air flow resistance of the impeller 136 can be more reduced.

In some implementations, in order to reduce the air flow resistance of the impeller 136, the wrap angle of the impeller 136 can be set to 90 degrees or less.

In some implementations, the impeller 136 can rotate relative to the second accommodating part 102 by the rotational force of the electric motor, thereby rotating air between the adjacent blades 1362. The rotating air can move from the top to the bottom of the second accommodating part 102 along the flow path between the outer surface of the hub 1361 and the inner surface of the second accommodating part 102.

A second housing cover 1210 can be mounted on a lower portion of the housing 100.

The second housing cover 1210 can include an outer cover 1211, a second flange 1216, a first inner hub 1212, a second bearing accommodating portion 1214, and a first vane 1213.

The outer cover 1211 can be formed in a hollow cylindrical shape. The outer cover 1211 can define an outer surface of the second housing cover 1210. The outer cover 1211 can have a constant diameter in the vertical direction.

The second flange 1216 can extend radially outward from an upper end (top) of the outer cover 1211.

The first flange 103 and the second flange 1216 can be disposed to overlap each other in the vertical direction.

The second flange 1216 can have a diameter that is slightly smaller than a diameter of the first flange 103.

The first flange 103 can have a thickness that is larger than a thickness of the second flange 1216.

A flange accommodating groove can be concavely formed in a lower surface of the first flange 103. The flange accommodating groove can accommodate the second flange 1216. The flange accommodating groove can be formed to be engaged with the second flange 1216.

The first flange 103 and the second flange 1216 each can include a plurality of coupling holes. The plurality of coupling holes can be formed through the first flange 103 and the second flange 1216, respectively, in a thickness direction.

The plurality of coupling holes formed through each of the first flange 103 and the second flange 1216 can be spaced apart from one another in the circumferential direction of the first and second flanges 103 and 1216.

With the configuration, the first and second flanges 103 and 1216 can be engaged with each other. Since coupling members such as screws are coupled to the first and second flanges 103 and 1216 through the plurality of coupling holes, the second housing cover 1210 can be coupled to the lower portion of the housing 100.

The first inner hub 1212 can be formed in a cylindrical shape. A diameter of the first inner hub 1212 can be smaller than a diameter of the outer cover 1211.

The first inner hub 1212 can be formed such that an upper portion is closed and a lower portion is opened.

An axial length of the outer cover 1211 can extend longer than an axial length of the first inner hub 1212.

An upper end portion of the first inner hub 1212 can protrude upward from the upper end of the first inner hub 1212. A center of the first inner hub 1212 can be disposed to coincide with a center of the outer cover 1211.

The second bearing accommodating portion 1214 can be disposed in the upper end portion of the first inner hub 1212. The second bearing accommodating portion 1214 can protrude upward from the upper end portion of the first inner hub 1212.

The second bearing accommodating portion 1214 can accommodate the second bearing 135.

The second bearing accommodating portion 1214 can be open upward. The second bearing 135 can be accommodated through the upper portion of the second bearing accommodating portion 1214.

The second bearing 135 can be implemented as a ball bearing. A second holder 1351 can be coupled to an outer circumferential surface of the second bearing 135 so as to surround the second bearing 135. The second holder 1351 can be formed in a circular ring shape.

A second O-ring 1352 can be mounted on an outer circumferential surface of the second holder 1351. The second O-ring 1352 can be provided by one or in plurality.

The second O-rings 1352 can be disposed in a spaced manner along a lengthwise direction of the second holder 1351.

Since the second O-ring 1352 and the second holder 1351 have the same or similar configuration to the aforementioned first O-ring 1342 and first holder 1341, a redundant description will be omitted.

A wave washer 1215 can be accommodated inside the second bearing accommodating portion 1214. The wave washer 1215 can be formed in a wavy ring shape. The wave washer 1215 can be disposed between a bottom surface in the second bearing accommodating portion 1214 and the second bearing 135.

The wave washer 1215 can lower surface pressure by evenly distributing pressure of the second bearing 135.

The second bearing 135 can be coupled to be in close contact with the inner surface of the second bearing accommodating portion 1214 by the second O-ring 1352. The wave washer 1215 can prevent the second bearing 135 from loosening in the second bearing accommodating portion 1214, like a spring washer.

A plurality of first vanes 1213 can be provided in an annular space between an inner circumferential surface of the outer cover 1211 and an outer circumferential surface of the first inner hub 1212.

The first vanes 1213 can protrude from the outer circumferential surface of the first inner hub 1212 to the inner circumferential surface of the outer cover 1211.

The first vanes 1213 can extend from the outer circumferential surface of the first inner hub 1212 to be inclined downward from the top to bottom of the first inner hub 1212. The first vanes 1213 can be implemented as an axial flow type.

The plurality of first vanes 1213 can connect the outer cover 1211 and the first inner hub 1212. Inner ends of the first vanes 1213 can be connected to the outer circumferential surface of the first inner hub 1212, and outer ends of the first vanes 1213 can be connected to the inner circumferential surface of the outer cover 1211.

The plurality of first vanes can be spaced apart from one another in the circumferential direction of the first inner hub 1212.

The plurality of first vanes 1213 can be fixedly disposed between the outer cover 1211 and the first inner hub 1212.

A second inner hub 1220 can be disposed at a lower portion of the first inner hub 1212. The first inner hub 1212 and the second inner hub 1220 can be disposed in series in the axial direction.

The second inner hub 1220 can be formed in a hollow cylindrical shape.

The second inner hub 1220 can have the same diameter as that of the first inner hub 1212.

The second inner hub 1220 can be mounted to the lower portion of the first inner hub 1212.

A center of the second inner hub 1220 can be disposed to coincide with the center of the outer cover 1211.

A plurality of second vanes 1222 can be disposed in an annular space between the inner circumferential surface of the outer cover 1211 and an outer circumferential surface of the second inner hub 1220. The second vanes 1222 and the second inner hub 1220 can be accommodated inside the outer cover 1211.

The second vanes 1222 can extend from the outer circumferential surface of the second inner hub 1220 to be inclined downward. The second vanes 1222 can be implemented as an axial flow type.

The plurality of second vanes 1222 can connect the outer cover 1211 and the second inner hub 1220. Inner ends of the second vanes 1222 can be connected to the outer circumferential surface of the second inner hub 1220 and outer ends of the second vanes 1222 can be connected to the inner circumferential surface of the outer cover 1211.

The plurality of second vanes can be spaced apart from one another in the circumferential direction of the second inner hub 1220.

The plurality of second vanes 1222 can be fixedly disposed between the outer cover 1211 and the second inner hub 1220.

A discharge portion 123 can be formed between the outer cover 1211 and the second inner hub 1220. The discharge portion 123 can be connected to communicate with the outside of the housing 100.

The discharge portion 123 can discharge air, which moves from the second accommodating part 102 to the inside of the second housing cover 1210, to the outside of the housing 100.

With the configuration, air suctioned by the impeller 136 can flow from the second accommodating part 102 into the inner flow path of the second housing cover 1210, namely, into the annular space between the inner circumferential surface of the outer cover 1211 and the outer circumferential surfaces of the first and second inner hubs 1220.

The first and second vanes 1213 and 1222 can be arranged in series in two stages inside the second housing cover 1210, to guide the air suctioned by the impeller 136 to move to the outside of the housing 100.

The first and second vanes 1213 and 1222 can minimize air flow resistance.

An inserting portion 1221 can be further provided on the upper portion of the second inner hub 1220. The inserting portion 1221 can enable coupling between the first inner hub 1212 and the second inner hub 1220. The inserting portion 1221 can protrude upward from the upper portion of the second inner hub 1220 to have a diameter smaller than the diameter of the second inner hub 1220.

The inserting portion 1221 can be formed in a hollow cylindrical shape. The inserting portion 1221 can be inserted into the first inner hub 1212 in an overlapping manner, such that the first inner hub 1212 and the second inner hub 1220 can be coupled to each other.

An upper portion of the inserting portion 1221 can extend inward in the radial direction. The upper portion of the inserting portion 1221 and the upper portion of the first inner hub 1212 can be disposed to overlap each other in the vertical direction. The upper portion of the inserting portion 1221 and the inner upper portion of the first inner hub 1212 can be coupled to each other by a coupling member such as a screw.

If the housing 100 does not have a uniform diameter in the axial direction and is recessed inward in the radial direction from the lower end of the first accommodating part 101 to the lower end of the second accommodating part 102 along the inclined part 105 and the neck part 104, support rigidity of the housing 100 in the axial direction can be reduced.

To compensate for this, a plurality of reinforcing ribs 124 can be provided on an outer side of the housing 100.

The reinforcing ribs 124 can be disposed on an outer lower portion of the housing 100.

The reinforcing ribs 124 can protrude outward in the radial direction from the neck part 104 to an outer end of the first accommodating part 101 and an outer end of the second accommodating part 102.

The reinforcing ribs 124 can have a height extending from the lower end of the first accommodating part 101 to the lower end of the second accommodating part 102.

The reinforcing rib 124 can be provided in plurality spaced apart from one another in the circumferential direction of the housing 100. This disclosure exemplarily illustrates three reinforcing ribs 124 that are spaced apart from one another at equal intervals of 120 degrees.

The reinforcing ribs 124 can be longitudinally disposed across the inclined part 105, the neck part 104, and the second accommodating part 102 in the vertical direction.

The lower end of the first accommodating part 101, the inclined part 105, the neck part 104, the second accommodation part 102, and the first flange 103 can be connected all together in the vertical direction by the plurality of reinforcing ribs 124.

Supporting portions 1090 (refer to FIG. 6) disposed inside the first accommodating part 101 and the reinforcing ribs 124 provided outside the second accommodating part 102 can be disposed to overlap each other in the vertical direction.

Accordingly, the axial support rigidity of the housing 100 can be reinforced.

The rotor assembly 130 can include a rotating shaft 131, a permanent magnet 132, and a plurality of end plates 133.

A center of the rotating shaft 131 can be disposed to coincide with a center of the housing 100.

The rotating shaft 131 can extend to pass through the center of the housing 100 in the axial direction.

The rotating shaft 131 can include first and second bearing support portions 1311 and 1312, a permanent magnet mounting portion 1313, a shaft extending portion 1314, and an impeller mounting portion 1315.

The first and second bearing support portions 1311 and 1312 can be located on both end portions of the rotating shaft 131. The first bearing support portion 1311 can be disposed on an upper end portion of the rotating shaft 131, that is, on an upstream side of the permanent magnet mounting portion 1313 based on a moving direction of air.

The second bearing support portion 1312 can be disposed on a lower end portion of the rotating shaft 131, that is, on a downstream side of the impeller mounting portion 1315 based on the moving direction of the air.

The both end portions of the rotating shaft 131 can be rotatably supported by the plurality of bearings 134 and 135.

The plurality of bearings 134 and 135 can include the first bearing 134 and the second bearing 135.

The first bearing support portion 1311 can be coupled through a central hole of the first bearing 134 so as to be supported by the first bearing 134. The second bearing support portion 1312 can be coupled through a central hole of the second bearing 135 so as to be supported by the second bearing 135.

The permanent magnet mounting portion 1313 can extend downward from the first bearing support portion 1311 to have a diameter that is slightly larger than a diameter of the first bearing support portion 1311. Based on the moving direction of the air, the permanent magnet mounting portion 1313 can be located at a downstream side of the first bearing support portion 1311.

The permanent magnet mounting portion 1313 can be longer in length than the first bearing support portion 1311.

A shaft accommodating hole can be formed through a center of the permanent magnet 132 in the axial direction.

The permanent magnet mounting portion 1313 can pass through the shaft accommodating hole.

The permanent magnet mounting portion 1313 can be longer in length than the permanent magnet 132. The permanent magnet 132 can be mounted to the permanent magnet mounting portion 1313 to be slidable in the axial direction along the permanent magnet mounting portion 1313.

In order to restrict the permanent magnet 132 from moving in the axial direction along the permanent magnet mounting portion 1313, the plurality of end plates 133 can be disposed on upper and lower portions of the permanent magnet 132, respectively. The plurality of end plates 133 can be disposed on upstream and downstream sides of the permanent magnet 132, respectively, based on the moving direction of the air, thereby restricting the movement of the permanent magnet 132 in the axial direction.

The shaft extending portion 1314 can be disposed on a downstream side of the permanent magnet mounting portion 1313 based on the moving direction of the air. The shaft extending portion 1314 can have a diameter that is slightly larger than a diameter of the permanent magnet mounting portion 1313.

When the diameter of the shaft extending portion 1314 is larger than the diameter of the permanent magnet mounting portion 1313, it can restrict the permanent magnet 132 from moving downward in the axial direction. Therefore, one of the plurality of end plates 133 can be excluded.

The impeller mounting portion 1315 can extend downward from the shaft extending portion 1314 to have a diameter that is smaller than the diameter of the shaft extending portion 1314.

Since the impeller mounting portion 1315 is coupled through the shaft coupling portion of the impeller 136, the impeller 136 can be mounted to the impeller mounting portion 1315.

A recess 1363 can be recessed in a lower portion of the hub 1361 of the impeller 136. The second bearing accommodating portion 1214 can be accommodated inside the recess 1363.

The recess 1363 of the impeller 136 can cover the second bearing accommodating portion 1214 and the second bearing 135.

With the configuration, the second bearing 135 can be stuck in the recess 1363. Accordingly, the second bearing 135 can be prevented from being separated to the outside of the second bearing accommodating portion 1214.

In addition, since the recess 1363 of the impeller 136 covers the second bearing accommodating portion 1214 and the second bearing 135, foreign substances such as dust contained in air can be prevented from being introduced into a gap between the second bearing accommodating portion 1214 and the second bearing 135.

The electric motor of the present disclosure can be implemented as a three-phase motor.

A three-phase motor can produce power by forming a rotating magnetic field around a rotor using three AC power sources having different phases.

In some examples, the stator assembly 110 can be accommodated in the first accommodating part 101.

The stator assembly 110 can include a stator core 111 and a plurality of stator coils 117.

The plurality of stator coils 117 can be wound around the stator core 111.

In some implementations, three stator coils 117 can be wound around the stator core 111.

AC power sources of three phases (e.g., U-phase, V-phase, and W-phase) can be connected to the three stator coils 117, respectively, to apply AC power to the stator coils 117. When AC power is applied to the stator coils 117, a rotating magnetic field can be generated around the rotor, so that the rotor can rotate.

The stator core 111 can include a back yoke 112 and a plurality of teeth 114.

The back yoke 112 can be formed in a hollow cylindrical shape.

The plurality of teeth 114 can be disposed inside the back yoke 112.

The plurality of stator coils 117 can be wound on the plurality of teeth 114, respectively. The number of teeth 114 can correspond to the number of stator coils 117.

The plurality of teeth 114 can be spaced apart from one another at equal intervals in a circumferential direction of the back yoke 112.

A plurality of inner flow paths 108 can be defined inside the back yoke 112.

The plurality of inner flow paths 108 can be defined between the adjacent teeth 114. The plurality of inner flow paths 108 and the plurality of teeth 114 can be alternately disposed in the circumferential direction of the back yoke 112.

Each of the plurality of inner flow paths 108 can be formed through the stator core 111 in the axial direction. Air introduced into the first accommodating part 101 can flow through the inside of the stator assembly 110 along the plurality of inner flow paths 108.

The stator core 111 employed in the electric motor can have a small diameter to miniaturize the motor.

When the stator core 111 has a small diameter, a diameter of the back yoke 112 can also be reduced. When the diameter of the back yoke 112 is reduced, a space between the back yoke 112 and the teeth 114 can be narrowed, which can make it difficult to wind the stator coils 117 around the plurality of teeth 114.

To solve this problem, the plurality of teeth 114 can be formed to be separated from the back yoke 112. The plurality of teeth 114 can be detachably coupled to an inner circumferential surface of the back yoke 112.

A plurality of tooth coupling grooves 113 can be concavely formed in the inner circumferential surface of the back yoke 112 in the radial direction. The tooth coupling grooves 113 can extend in the axial direction of the back yoke 112.

A coupling protrusion 116 can protrude from an outer end portion of each tooth 114.

The coupling protrusion 116 of the tooth 114 can be coupled to the tooth coupling groove 113 of the back yoke 112 to be slidable in the axial direction.

After the stator coils 117 are wound around the teeth 114, the plurality of teeth 114 can be slidably coupled to the tooth coupling grooves 113 of the back yoke 112.

An insulator 118 can be disposed between the stator core 111 and the stator coils 117.

The insulator 118 can electrically insulate between the adjacent stator coils 117.

The insulator 118 can include a plurality of back yoke insulators 1181 and a plurality of tooth insulators 1184.

The back yoke insulator 1181 can surround an inner surface and both end portions of the back yoke 112.

The back yoke insulator 1181 can be separated into an upper back yoke insulator 1182 and a lower back yoke insulator 1183.

The upper back yoke insulator 1182 can surround an upper end portion and the inner surface of the back yoke 112.

The lower back yoke insulator 1183 can surround a lower end portion of the back yoke 112.

Each of the plurality of tooth insulators 1184 can include an upper tooth insulator 1185 and a lower tooth insulator 1186.

The upper tooth insulator 1185 can surround an upper surface and parts or portions of both side surfaces of the tooth 114.

The lower tooth insulator 1186 can surround a lower surface and portions of both side surfaces of the tooth 114.

A lower end portion of the upper tooth insulator 1185 and an upper end portion of the lower tooth insulator 1186 can be coupled to each other in the middle of the both side surfaces of the tooth 114 to overlap each other.

A plurality of power terminals 1190 can be connected to one end portion of each of the plurality of stator coils 117 to supply three-phase AC power.

Neutral terminals 1191 can be connected to another end portions of the plurality of stator coils 117, respectively. The neutral terminals 1191 can be disposed to connect the another end portions of the respective three-phase stator coils 117.

Terminal mounting portions can be formed at an outer end portion of the upper tooth insulator 1185. The terminal mounting portions can include power terminal mounting portions 1194 and neutral terminal mounting portions 1195.

The power terminal mounting portion 1194 and the neutral terminal mounting portion 1195 can each have an accommodation space therein, and thus the power terminal 1190 and the neutral terminal 1191 can be mounted to the power terminal mounting portion 1194 and the neutral terminal mounting portion 1195, respectively.

The power terminal mounting portion 1194 and the neutral terminal mounting portion 1195 can be isolated from each other by a partition wall. The power terminal 1190 can be mounted on the power terminal mounting portion 1194 and connected to one end portion of the stator coil 117. The neutral terminal 1191 can be mounted on the neutral terminal mounting portion 1195 and connected to another end portion of the stator coil 117.

The plurality of neutral terminals 1191 can be connected by a connection ring 1192. The connection ring 1192 can be formed in a circular ring shape.

A plurality of connection bars 1193 can be provided on the connection ring 1192. The plurality of connection bars 1193 can extend radially outward from an outer circumferential surface of the connection ring 1192. Each of the connection bars 1193 can have a structure bent in the axial direction to be connected to the neutral terminal 1191. The plurality of neutral terminals 1191 can be connected by the connection bars 1193 and the connection ring 1192.

The rotor assembly 130 can be disposed inside the stator assembly 110 with an air gap therebetween. The rotor assembly 130 can rotate relative to the stator assembly 110.

A rotor accommodating hole can be defined at a central portion in the stator core 111. A pole shoe 115 can protrude from an inner end portion of each tooth 114 in the circumferential direction. The rotor accommodating hole can be formed through the stator assembly 110 in the axial direction at an inner side of the plurality of pole shoes 115.

The permanent magnet 132 can be accommodated in the rotor accommodating hole.

The stator assembly 110 and the rotor assembly 130 can be disposed between the first bearing 134 and the second bearing 135.

Since the stator assembly 110 and the rotor assembly 130 electromagnetically interact with each other, the rotor assembly 130 can be rotated with respect to the stator assembly 110.

The three stator coils 117 can generate a rotating magnetic field around the permanent magnet 132 by receiving three-phase AC power.

The permanent magnet 132 can be rotated by the rotating magnetic field. The permanent magnet 132 and the rotating shaft 131 can rotate integrally.

The impeller 136 can be disposed between the first bearing 134 and the second bearing 135.

When the rotor assembly 130 and the impeller 136 are disposed between the first bearing 134 and the second bearing 135, the first bearing 134 and the second bearing 135 can support both ends of the rotating shaft 131, thereby enhancing structural stability during the rotation of the rotor assembly 130 and the impeller 136.

The stator assembly 110 and the rotor assembly 130 can be disposed at an upstream side of the impeller 136 based on a moving direction of air.

When the stator assembly 110 and the rotor assembly 130 are disposed at the upstream side of the impeller 136, external cold air of the housing 100 can be suctioned into the impeller 136 through the inner flow path 108 of the stator assembly 110, which can improve cooling performance of the motor more efficiently.

The inner flow path 108 of the stator assembly 110 can include an inner space of the back yoke 112.

The inner flow path 108 can include spaces defined between neighboring windings of the plurality of stator coils 117 respectively wound on the plurality of teeth 114.

The inner flow path 108 can include air gaps between the teeth 114 and the permanent magnet 132.

In some examples, since the plurality of stator coils 117, the plurality of teeth 114, the permanent magnet 132, and the rotating shaft 131 are accommodated in the inner space of the back yoke 112, a space in which air flows through the inner flow path 108 in the axial direction can be very narrow. This can cause a high flow resistance and flow loss.

In some implementations, the electric motor can provide a bypass flow path 109. For example, the bypass flow path 109 can be provided outside or inside the housing 100. In some implementations, the bypass flow path 109 is defined inside the housing 100. In some examples, the bypass flow path 109 can be defined at an outer side of the stator assembly 110. In some examples, the bypass flow path 109 can be located between the housing 100 and the stator core 111.

In some examples, the bypass flow path 109 can be defined between the inner circumferential surface of the housing 100 and the outer circumferential surface of the back yoke 112. In some examples, the bypass flow path 109 can be recessed in a thickness direction inside the housing 100. In some examples, the bypass flow path 109 can be disposed in the first accommodating part 101. In some examples, the bypass flow path 109 can be provided in plurality inside the first accommodating part 101. The number of bypass flow paths 109 can correspond to the number of windings of the stator coils 117.

The disclosure exemplarily illustrates three bypass flow paths 109.

The plurality of bypass flow paths 109 can extend in the circumferential direction in a shape that a radial width is narrow and a length in the circumferential direction is relatively longer than the width.

The plurality of bypass flow paths 109 can be formed in a circular ring shape.

Each of the plurality of bypass flow paths 109 can be formed in an arcuate shape.

The plurality of bypass flow paths 109 can be disposed in the first accommodating part 101 to be spaced apart from one another in the circumferential direction.

A plurality of supporting portions 1090 can be provided inside the housing 100. The plurality of supporting portions 1090 can come in contact with an outer circumferential surface of the stator core 111 to support the stator core 111.

The plurality of supporting portions 1090 can protrude radially inward from the inner circumferential surface of the first accommodating part 101.

The plurality of supporting portions 1090 can be spaced apart from one another in the circumferential direction of the housing 100. Central portions of the plurality of supporting portions 1090 can be disposed to be spaced apart from one another at equal intervals in the circumferential direction.

In some implementations, three supporting portions 1090 can be provided, and the plurality of supporting portions 1090 can be disposed to be spaced apart at equal intervals of 120 degrees along the circumferential direction.

The plurality of bypass flow paths 109 and the plurality of supporting portions 1090 can be alternately disposed in the circumferential direction of the housing 100.

The bypass flow path 109 can have a circumferential length that is set in a ratio within a range of 1/4 (90 degrees/360 degrees) to 1/3 (120 degrees/360 degrees) with respect to a circumferential length of the first accommodating part 101 (circumference of one round of 360 degrees).

The circumferential length of the bypass flow path 109 can be longer than a circumferential length of the supporting portion 1090.

The circumferential length of the supporting portion 1090 can be set in a ratio within a range of 1/5 to 1/6 with respect to the circumferential length of the bypass flow path 109.

The supporting portion 1090 can have an axial height that extends from an upper end of the intake part 106 to a lower end of the first accommodating part 101.

Each of the plurality of supporting portions 1090 can include first to third supporting portions 1091 to 1093.

The first supporting portion 1091 can protrude radially inward from an inner circumferential surface of the intake part 106. The plurality of first supporting portions 1091 can be disposed between the side holes adjacent to each other, respectively.

The first housing cover 120 can be coupled to an upper portion of the intake part 106. The first supporting portion 1091 can be provided with a coupling groove formed in the vertical direction. The outer ring portion 1201 of the first housing cover 120 and the first supporting portion 1091 of the intake part 106 can be coupled to each other by coupling members such as screws. The first supporting portion 1091 can fix the first housing cover 120 to the upper portion of the intake part 106.

In some implementations, since a radially protruding length of the first supporting portion 1091 is thicker than a thickness of the intake part 106, thickness rigidity of the intake part 106, which is weakened due to the side hole 107, can be reinforced.

The plurality of side holes 107 can be formed through the intake part 106 inwardly in the radial direction. Through the plurality of side holes 107, air can move from the outside to inside of the housing 100 in the radial direction.

In addition, the first supporting portion 1091 can be disposed between the adjacent side holes 107 in the circumferential direction and protrude inward in the radial direction, so as to guide air, which is introduced from the outside of the housing 100 through the side holes 107, to move in the radial direction.

A part of the winding of the stator coil 117 can be disposed to protrude to the upper portion of the first accommodating part 101.

The air introduced in the radial direction through the side holes 107 can be brought into contact with the stator coils 117 so as to cool heat generated in the stator coils 117 through heat exchange.

The second supporting portion 1092 can be provided on a lower portion of the first supporting portion 1091.

The second supporting portion 1092 can extend downward from the upper end of the first accommodating part 101. The second supporting portion 1092 can protrude radially inward from the inner circumferential surface of the first accommodating part 101.

The plurality of second supporting portions 1092 can support the outer circumferential surface of the back yoke 112 of the stator core 111.

The plurality of second supporting portions 1092 can define one side surface of the bypass flow path 109.

The plurality of bypass flow paths 109 can be defined by the inner circumferential surface of the first accommodating part 101, one side surface of each of the plurality of second supporting portions 1092, and the outer circumferential surface of the back yoke 112.

The plurality of bypass flow paths 109 can communicate with the plurality of side holes 107.

The plurality of bypass flow paths 109 and the plurality of axial through-holes 1205 of the first housing cover 120 can be disposed to overlap each other in the vertical direction.

With the configuration, the plurality of bypass flow paths 109 can communicate with the axial through-holes 1205 of the first housing cover 120 in the vertical direction.

The first supporting portion 1091 and the second supporting portion 1092 can be disposed on the same perpendicular line in the vertical direction and can be integrally formed with each other.

Inner surfaces of the first supporting portion 1091 and the second supporting portion 1092 can be formed in a curved shape.

The inner surfaces of the first supporting portion 1091 and the second supporting portion 1092 can be disposed on the same perpendicular curved surface.

The inner surface of the second supporting portion 1092 can be in surface-contact with the outer circumferential surface of the back yoke 112, and the second supporting portion 1092 can support the stator core 111.

The outer circumferential surface of the stator core 111 can be press-fitted to the inner surface of the second supporting portion 1092.

With the configuration, the first supporting portion 1091 can guide the stator core 111 to be press-fitted to the inner surface of the second supporting portion 1092 when assembling the stator assembly 110.

The third supporting portion 1093 can be provided on a lower portion of the second supporting portion 1092.

The third supporting portion 1093 can protrude radially inward from the inner circumferential surface of the first accommodating part 101.

The third supporting portion 1093 can protrude more radially inward from the lower end of the second accommodating portion 1092.

The third supporting portion 1093 can have a height extending from the lower end of the second supporting portion 1092 to the lower end of the first accommodating portion 1091. The lower end of the second supporting portion 1092 can be located higher than an inner lower end of the first accommodating part 101 by the height of the third supporting portion 1093.

An upper end of the third supporting portion 1093 can be formed horizontally. The upper end of the third supporting portion 1093 is formed in a planar shape that is horizontally flat in the circumferential direction.

With the configuration, the lower end portion of the back yoke 112 of the stator core 111 can be seated on the flat upper surface of the third supporting portion 1093. The third supporting portion 1093 can limit a vertical movement of the stator assembly 110. The third supporting portion 1093 can horizontally support the stator assembly 110.

The bypass flow path 109 can be defined between the outer circumferential surface of the back yoke 112 and the inner circumferential surface of the first accommodating part 101. With the configuration, the bypass flow path 109 can expand a cross-sectional area of a flow path of air passing through the inside of the housing 100.

The bypass flow path 109 can be isolated from the inner flow path 108 of the back yoke 112.

The bypass flow path 109 can isolate a part of air introduced into the first accommodating part 101 from a part of air passing through the inner flow path 108 of the back yoke 112. The inner flow path 108 of the back yoke 112 can accommodate the plurality of teeth 114 and the windings of the plurality of stator coils 117. Accordingly, significantly great flow resistance can be caused in the inner flow path 108 compared to the bypass flow path 109.

A part of air introduced into the first accommodating part 101 can bypass the stator assembly 110 through the bypass flow path 109.

Another part of the air introduced into the first accommodating part 101 can pass through the inner flow path 108 of the back yoke 112.

A flow rate of air passing through the bypass flow path 109 can be much greater than a flow rate of air passing through the inner flow path 108 of the back yoke 112.

Assuming that the flow rate of the air introduced into the first accommodating part 101 is 100%, the air flow rate in the bypass flow path 109 and the air flow rate in the inner flow path 108 can be 80% to 20%.

An area of the bypass flow path 109 can be smaller than an area of the inner flow path 108 of the back yoke 112, but the flow rate of the bypass flow path 109 can be much greater than the flow rate of the inner flow path 108 of the back yoke 112.

Accordingly, the bypass flow path 109 can minimize flow resistance occurred in a structure in which the back yoke 112 surrounds the stator coil 117, and the first accommodating part 101 of the housing 100 surrounds the back yoke 112.

In addition, air flowing along the bypass flow path 109 can be brought into contact with the outer circumferential surface of the back yoke 112 of the stator core 111, subjected to heat exchange, thereby improving cooling performance of the stator core 111.

The plurality of teeth 114 and the windings of the plurality of stator coils 117 can be located at the inner side of the back yoke 112, such that a center of a circumferential width (thickness) of the tooth 114 coincides with a center of a circumferential length of the bypass flow path 109 in the radial direction.

A radial center line passing through a center of the winding of the stator coil 117 wound on the tooth 114 in the radial direction can coincide with the center of the circumferential length of the bypass flow path 109.

With the configuration, when air is moving along the bypass flow path 109, the smallest flow resistance can occur at a central portion of the bypass flow path 109 in the circumferential direction. Therefore, a flow velocity at the central portion of the bypass flow path 109 in the circumferential direction can be much faster than a flow velocity at both ends of the bypass flow path 109 in the circumferential direction.

Since the stator coil 117 generates the most heat when driving the electric motor, the stator coil 117 can be more efficiently cooled by arranging the central portions of the stator coil 117 and the tooth 114 at the central portion of the bypass flow path 109 in the circumferential direction where air flows at the fastest flow velocity.

Even if the bypass flow path 109 is small in size, the cooling performance of the electric motor can be greatly improved.

The air passing through the bypass flow path 109 can merge with the air passing through the inner flow path 108 of the back yoke 112 at the inclined part 105 between the first accommodating part 101 and the neck part 104.

Figure 10:
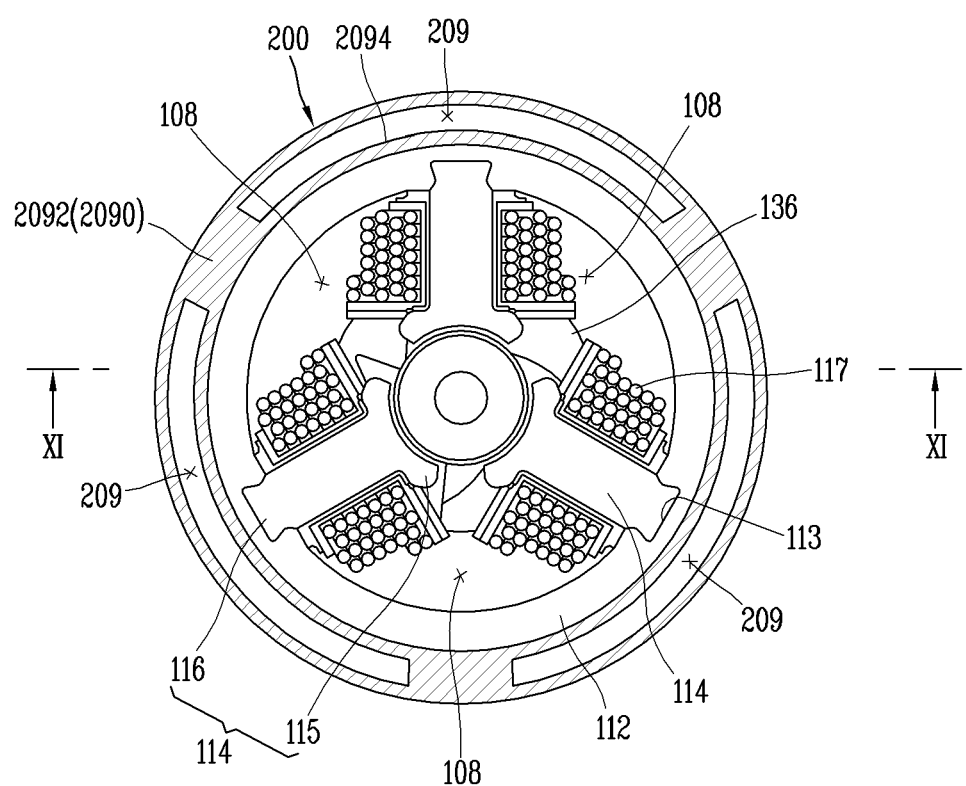
FIG. 10 is a cross-sectional view illustrating an example of a supporting portion of a housing.

FIG. 10 is a cross-sectional view illustrating an example of a supporting portion 2090 of a housing 200.

Figure 11:
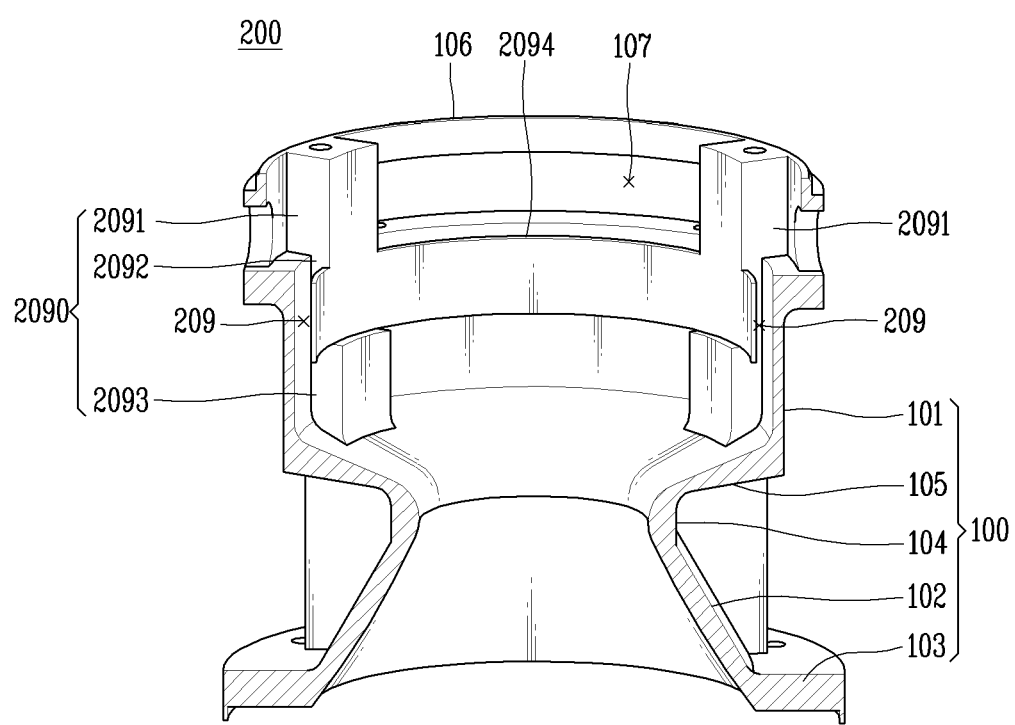
FIG. 11 is a cross-sectional view, taken along the line XI-XI of FIG. 10, illustrating an example of an internal structure of the housing with the stator assembly being removed.

FIG. 11 is a cross-sectional view taken along the line XI-XI of FIG. 10, which illustrates an example of an internal structure of the housing 200 with the stator assembly 110 removed.

Some implementations can include the technical features described above with respect to FIGS. 1-9, and can also include features different from the foregoing implementations described with reference to FIGS. 1 to 9 in that the supporting portion 2090 further includes a supporting rib 2094.

For example, the supporting rib 2094 can support the stator core 111 by surrounding the stator core 111.

The supporting rib 2094 can be disposed at an outer side of the stator core 111. The supporting rib 2094 can surround an outer circumferential surface of the stator core 111. The supporting rib 2094 can be formed in a circular ring shape to come in contact with the outer circumferential surface of the back yoke 112. The supporting rib 2094 can surround the entire outer circumferential surface of the back yoke 112. The supporting rib 2094 can extend along the circumferential direction of the back yoke 112.

The supporting rib 2094 can have a thickness that is thinner than a thickness of the first accommodating part 101.

The supporting rib 2094 can have a height that is lower than a height of a second supporting portion 2092. The height of the supporting rib 2094 can be the same as the height of the back yoke 112.

An upper end of the supporting rib 2094 can be disposed to be lower than the upper end of the first accommodating part 101.

With the configuration, as the upper end of the supporting rib 2094 is located lower than the side holes 107, resistance of air that is caused when the air flowing into the first accommodating part 101 through the side holes 107 passes through the upper end of the supporting rib 2094 can be reduced.

The supporting rib 2094 can be spaced apart radially inward from the inner circumferential surface of the first accommodating part 101.

A plurality of second supporting portions 2092 and a plurality of supporting ribs 2094 can extend along the circumferential direction of the back yoke 112 to form a single closed loop.

The supporting ribs 2094 can be interposed between the second supporting portions 2092 adjacent to each other, respectively, to connect the plurality of second supporting portions 2092.

The supporting rib 2094 can be formed in a curved shape with the same curvature as that of the stator core 111.

The supporting rib 2094 can surround the entire outer circumferential surface of the stator core 111 to further increase rigidity for supporting the stator assembly 110.

A bypass flow path 209 can be defined between the inner circumferential surface of the first accommodating part 101 and the supporting rib 2094.

Since other components are the same as or similar to those in the foregoing implementation of FIGS. 1 to 9, duplicated descriptions will be omitted.

Figure 12:
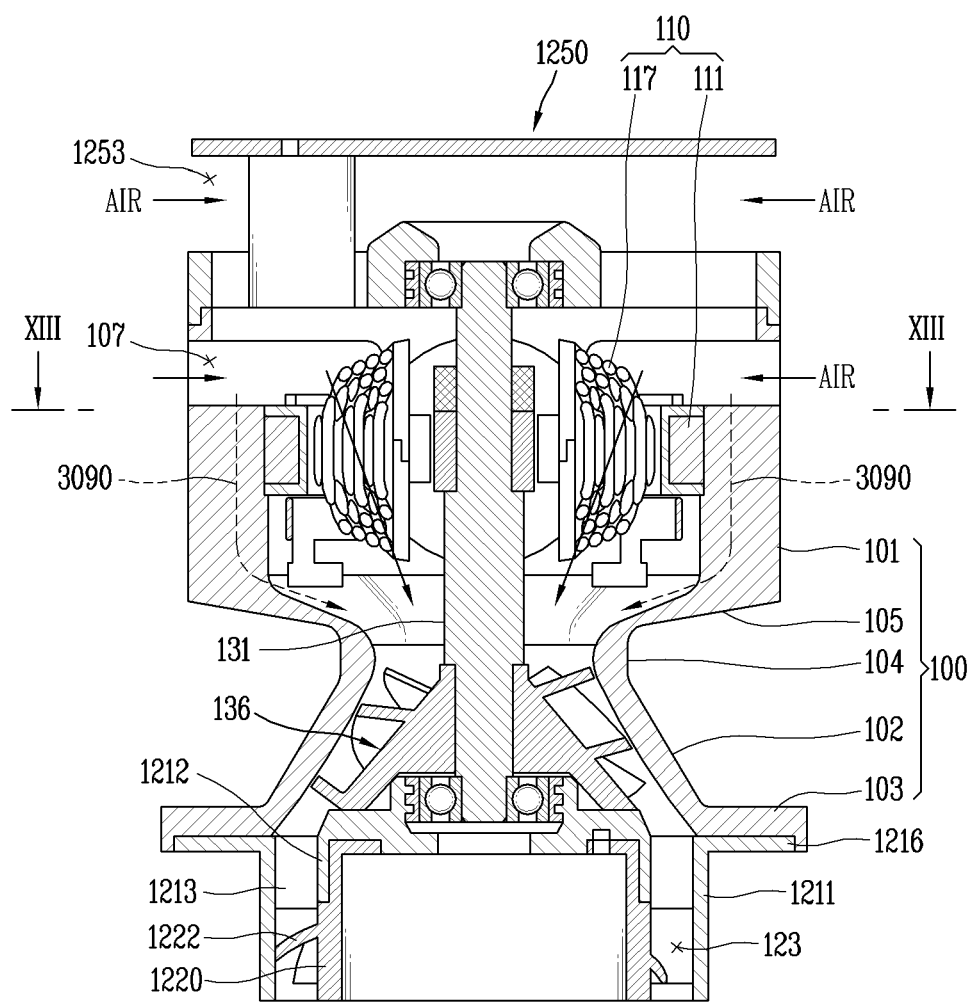
FIG. 12 is a conceptual view illustrating an example of an electric motor.

FIG. 12 is a conceptual view illustrating an example of an electric motor.

Figure 13:
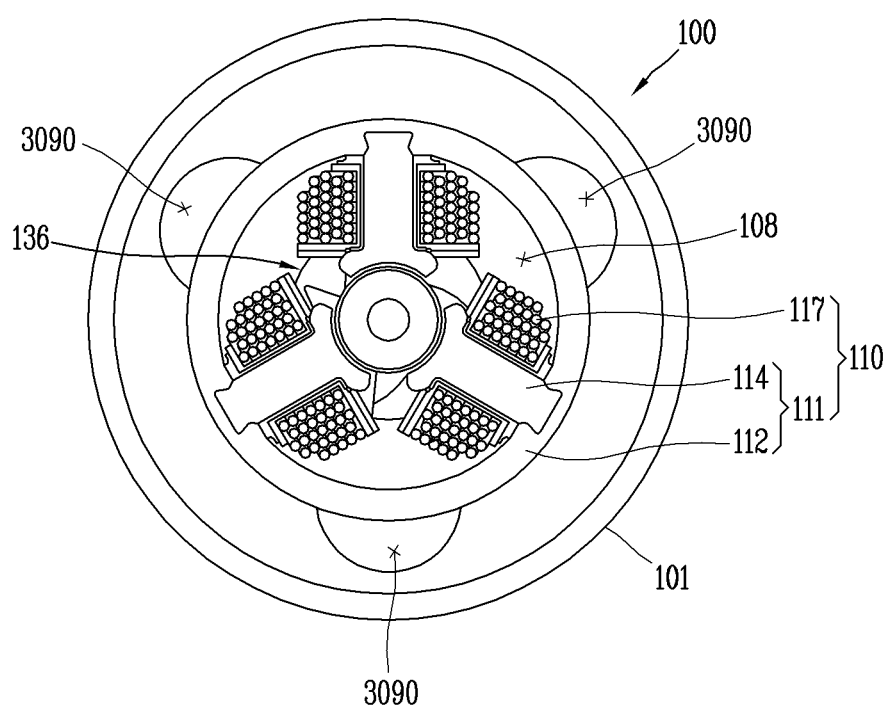
FIG. 13 is a conceptual view illustrating an example of a bypass flow path having an arcuate shape.

FIG. 13 is a conceptual view illustrating an example of a bypass flow path 3090 having an arcuate shape.

This implementation is different from the implementations illustrated in FIGS. 1 to 11 in that the bypass flow path 3090 is formed in an arcuate shape.

The bypass flow path 3090 can be provided in plurality inside the first accommodating part 101.

The bypass flow path 3090 can be recessed radially outward into the inner circumferential surface of the first accommodating part 101.

The bypass flow path 3090 can be defined to penetrate through the first accommodating part 101 in the axial direction.

The bypass flow path 3090 can be formed in a semicircular or arcuate shape.

The bypass flow path 3090 can have a curvature that is smaller than a curvature of the first accommodating part 101.

The plurality of bypass flow paths 3090 can be disposed to be spaced apart from one another in the first accommodating part 101 in the circumferential direction. This implementation illustrates three bypass flow paths 3090, but the present disclosure may not be limited to this.

Centers of the bypass flow paths 3090 can be spaced apart from one another at equal intervals of 120 degrees in the circumferential direction.

An arcuate length of the bypass flow path 3090 can be greater than 1/12 of a circumferential length of the back yoke 112 and smaller than 1/8 of a circumferential length of the outer circumferential surface of the first accommodating part 101.

A plurality of first radial center lines passing through arcuate centers of the bypass flow paths 3090 and a center of the stator core 111 in the radial direction and a plurality of second radial center lines passing through circumferential centers of the teeth 114 and the center of the stator core 111 in the radial direction can be alternately disposed with a phase difference of 60 degrees.

In FIG. 12, an arrow indicated by a solid line shows the flow of air passing through the inner flow path 108 of the stator core 111, and an arrow indicated by a dotted line indicates the flow of air passing through the bypass flow path 3090.

The reason why the flow of air in the bypass flow path 3090 is indicated by the dotted line is that the bypass flow path 3090 is not actually visible in the cross-sectional view of FIG. 12.

In some examples, the supporting portion may not include the first supporting portion 1091 protruding from the inner circumferential surface of the intake part.

Since other components are the same as or similar to those in the foregoing implementations of FIGS. 1 to 11, duplicated descriptions will be omitted.

Figure 14:
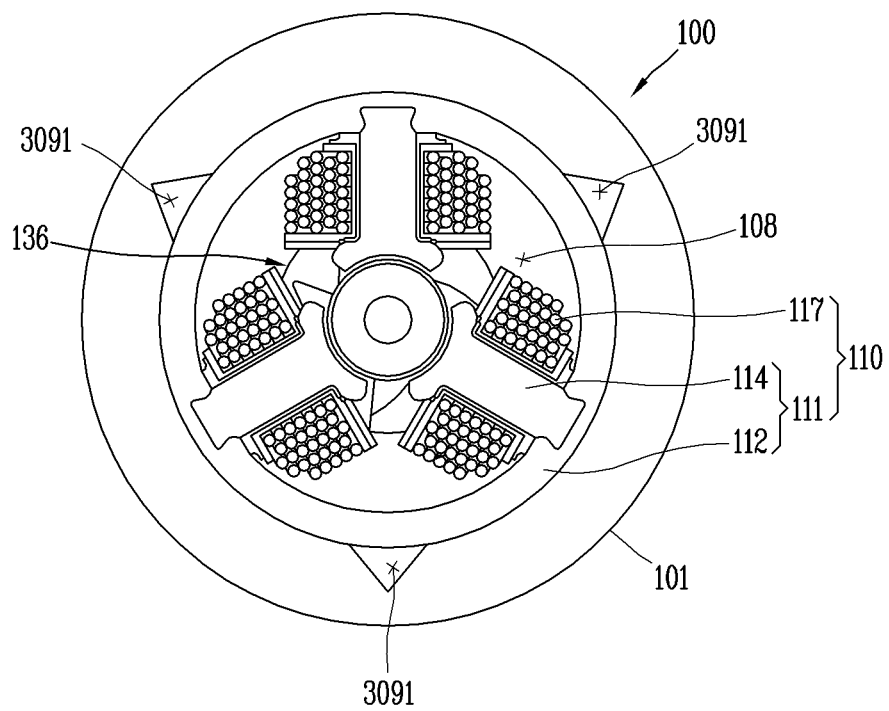
FIG. 14 is a conceptual view illustrating an example of a bypass flow path having a triangular shape.

FIG. 14 is a conceptual view illustrating an example of a bypass flow path 3091 having a triangular shape.

The following implementations can include the technical features described above with respect to FIGS. 1 to 13, and can also include features different from the foregoing implementations of FIGS. 1 to 13 in that the bypass flow path 3091 has a cross-section with a triangular shape.

In some implementations, the bypass flow path 3091 can have a cross-section in a polygonal shape such as a rectangular shape, in addition to the triangular shape, and also have a cross-section in various shapes such as a circular shape and the like.

The number of bypass flow paths 3091 may not be limited to three.

The bypass flow path 3091 can be provided in plurality inside the first accommodating part 101.

The bypass flow path 3091 can be recessed radially outward into the inner circumferential surface of the first accommodating part 101.

The bypass flow path 3091 can be defined to penetrate through the first accommodating part 101 in the axial direction.

The bypass flow path 3091 can be formed in a triangular shape. The bypass flow path 3091 can be formed in a polygonal shape such as a rectangular shape, in addition to the triangular shape.

The plurality of bypass flow paths 3091 can be disposed to be spaced apart from one another in the first accommodating part 101 in the circumferential direction. The disclosure illustrates three bypass flow paths 3091, but the present disclosure may not be limited to this.

Centers of the bypass flow paths 3091 can be spaced apart from one another at equal intervals of 120 degrees in the circumferential direction of the back yoke 112.

An arcuate length of the bypass flow path 3091 can be greater than 1/20 of a circumferential length of the outer circumferential surface of the back yoke 112 and smaller than 1/8 of a circumferential length of the outer circumferential surface of the first accommodating part 101.

A plurality of first radial center lines passing through centers of circumferential widths of the bypass flow paths 3091 and a center of the stator core 111 in the radial direction and a plurality of second radial center lines passing through circumferential centers of the teeth 114 and the center of the stator core 111 in the radial direction can be alternately disposed with a phase difference of 60 degrees.

In some examples, the supporting portion may not include the first supporting portion 1091 protruding from the inner circumferential surface of the intake part.

Since other components are the same as or similar to those in the foregoing implementations of FIGS. 1 to 13, duplicated descriptions will be omitted.

Hereinafter, the operation and effects of the bypass flow path 109 will be described with reference to FIGS. 1 to 9.

The operation and effects of the bypass flow path 109 can also be applied to the implementations of FIGS. 10 to 14.

Hereinafter, a movement path of air will be described.

Air can be introduced through the lateral flow paths 1253 of the inverter 1250/the side holes 107 of the electric motor, divergently flow into the axial through-holes 1205 of the first housing cover 120→the intake part 106→the inner flow paths 108/bypass flow paths 109 of the stator assembly 110, merge at the inclined part 105, and be discharged through the neck part 104→the impeller 136→the first vanes 1213 of the second housing cover 1210→the second vanes 1222.

In more detail, external air of the housing 100 can be introduced into the housing 100 through two movement paths.

A first movement path can be a path along which air flows into the inverter 1250 through the plurality of lateral flow paths 1253.

The plurality of first and second coupling portions 1202 and 1252 can be disposed between the PCB 1251 of the inverter 1250 and the first housing cover 120. The plurality of lateral flow paths 1253 can extend through between the plurality of first and second coupling portions 1202 and 1252 in the radial direction.

The external air of the housing 100 can be introduced into the PCB 1251 of the inverter 1250 through the plurality of lateral flow paths 1253, so as to cool semiconductor devices, namely, IGBT and capacitor, mounted on the PCB 1251.

A second movement path can be a path along which air is introduced into the electric motor through the plurality of side holes 107.

The plurality of side holes 107 can be disposed on the side surface of the intake part 106 to be spaced apart from one another in the circumferential direction. The plurality of side holes 107 can be formed through the intake part 106 in the radial direction. The intake part 106 can communicate with the outside of the housing 100 through the side holes 107.

The external air of the housing 100 can be introduced into the intake part 106 through the plurality of side holes 107.

The plurality of axial through-holes 1205 can be disposed in the first housing cover 120. The plurality of axial through-holes 1205 can be formed through the first housing cover 120 in the axial direction.

The inner space of the PCB 1251 of the inverter 1250 and the inner space of the intake part 106 can communicate with each other through the axial through-holes 1205.

Air in the inner space of the inverter 1250 can flow into the intake part 106 through the plurality of axial through-holes 1205 after cooling the inverter 1250.

The air inside the intake part 106 can divergently flow into two movement paths in the intake part 106.

A third movement path can be a path defined by the plurality of inner flow paths 108.

The plurality of inner flow paths 108 can be formed through the inside of the stator core 111 in the axial direction.

The inner flow paths 108 can be formed through the inside of the stator assembly 110.

A fourth movement path can be a path defined by the plurality of bypass flow paths 109.

The plurality of bypass flow paths 109 can be defined between the stator core 111 and the first accommodating part 101.

The plurality of bypass flow paths 109 can be formed through the inside of the first accommodating part 101 in the axial direction.

The bypass flow paths 109 can define a movement path bypassing the third movement path, namely, the inner flow paths 108 of the stator assembly 110.

An air-flowing direction in the first movement path and the second movement path can be the radial direction, and an air-flowing direction in the third movement path (the inner flow paths 108) and the fourth movement path (the bypass flow paths 109) can be the axial direction.

The third and fourth movement paths can be perpendicular to the first and second movement paths.

Air in the intake part 106 can be divergently introduced into the inner flow paths 108 and the bypass flow paths 109.

A part of the air in the intake part 106 can pass through the plurality of inner flow paths 108.

In addition, another part of the remaining air in the intake part 106 can pass through the plurality of bypass flow paths 109.

The air moved through the inner flow paths 108 and the air moved through the bypass flow paths 109 can merge with each other at the inclined part 105.

The air merged in the inclined part 105 can move to the upstream side of the impeller 136 as the cross-sectional area of the flow path is gradually narrowed.

The air passing through the neck part 104 can receive rotational force from the impeller 136 and move in the axial direction of the second accommodating part 102.

The first vanes 1213 and the second vanes 1222 of the second housing cover 1210 can guide the air, which has passed through the impeller 136 in an axial flow form, to flow in the axial direction.

The air passing through the impeller 136 can flow sequentially along the first vanes 1213 and the second vanes 1222 of the second housing cover 1210. The air can then flow out of the housing 100 and blow in one direction.

In some implementations, in a three-phase motor, the stator assembly 110 and the rotor assembly 130 can be accommodated in the housing 100.

In a small motor, the stator assembly 110 can be configured such that the stator coils 117 are wound on the teeth 114, separately provided from the back yoke 112 of the stator core 111, and the windings of the stator coils 117 are then accommodated in the back yoke 112.

When the windings of the plurality of stator coils 117 are accommodated inside the back yoke 112, spaces of the inner flow paths 108 penetrating through the inside of the back yoke 112 are very narrow.

This can cause flow resistance and flow loss of air passing through the back yoke 112 in the small motor.

In some implementations, the bypass flow paths 109 that bypass the stator assembly 110 can be further provided inside the housing 100 to minimize flow resistance and flow loss of air.

In some examples, since the plurality of bypass flow paths 109 expand a movement area of air, the flow resistance and flow loss of the air can be reduced, compared to the case where only the inner flow paths 108 of the stator assembly 110 are provided as a flow path penetrating through the housing 100.

In some implementations, an intake path in the first accommodating part 101 can be divided into the inner flow paths 108 and the bypass flow paths 109 so as to induce a flowing direction of air from the inner flow paths 108 having great flow resistance to the bypass flow paths 109 having small flow resistance.

The bypass flow paths 109 can have much lower flow resistance and flow loss than those in the inner flow paths 108 penetrating through the stator assembly 110. Therefore, even if a cross-sectional area of the bypass flow paths 109 is smaller than that of the inner flow paths 108 of the back yoke 112, more air can flow into the bypass flow paths 109 with the low resistance.

Accordingly, heat generated in the stator assembly 110 can be discharged to the bypass flow paths 109, resulting in enhancing the cooling performance of the stator.

Although the bypass flow paths 109 have the very small cross-sectional area, the great effect of reducing the flow resistance and the flow loss can be provided. This can allow high cooling performance to be secured by the bypass flow paths 109 with the small cross-sectional area.

In some implementations, the plurality of supporting portions 1090 that partially or entirely surround the stator core 111 can be provided inside the housing 100, so as to efficiently support the motor even with a small size.

In some implementations, the plurality of bypass flow paths 109 can be spaced apart from the plurality of supporting portions 1090 at equal intervals in the circumferential direction, so as to evenly distribute the flow rate of air bypassing the stator assembly 110.

In some implementations, as the plurality of bypass flow paths 109 and the plurality of supporting portions 1090 are alternately disposed between the inner surface of the housing 100 and the outer circumferential surface of the stator core 111, a simple structure can be achieved even if the bypass flow paths 109 are included in the housing 100.

In some implementations, the housing 100 having the bypass flow paths 109 and the motor having the bypass flow paths 109 can be applied to various appliances such as a vacuum cleaner and an air dryer.

What is claimed is:

1. An electric motor comprising:
   a housing;
   a stator assembly disposed in the housing;
   a rotor assembly rotatably disposed in the stator assembly, the rotor assembly comprising a rotating shaft and a permanent magnet disposed at the rotating shaft;
   a first bearing and a second bearing that are spaced apart from each other, the permanent magnet being disposed between the first bearing and the second bearing;
   a first housing cover that is disposed at a first side of the housing and accommodates the first bearing therein;
   a second housing cover that is disposed at a second side of the housing; and
   an impeller configured to be rotated by the rotor assembly and to generate a flow of air,
   wherein the stator assembly defines an inner flow path configured to guide a part of the air to pass through an inside of the stator assembly,
   wherein the housing defines a bypass flow path at an outside of the stator assembly, the bypass flow path being configured to guide another part of the air to bypass the stator assembly, and
   wherein the second housing cover comprises:
      an outer cover,
      an inner hub disposed inside the outer cover, and
      a plurality of vanes that connect the inner hub to the outer cover, the plurality of vanes protruding from an outer circumferential surface of the inner hub to an inner circumferential surface of the outer cover.

2. The electric motor of claim 1, wherein the bypass flow path is defined along an inner circumferential surface of the housing and extends radially outward relative to the inner flow path, the bypass flow path being defined at an outer side of the inner flow path.

3. The electric motor of claim 1, wherein the bypass flow path is defined at an upstream side relative to the impeller in a flowing direction of the air.

4. The electric motor of claim 1, further comprising a supporting portion that is disposed inside the housing and supports the stator assembly.

5. The electric motor of claim 1, further comprising a plurality of supporting portions that protrude radially inward from an inner circumferential surface of the housing and support an outer circumferential surface of the stator assembly,
   wherein the bypass flow path extends between the plurality of supporting portions in a circumferential direction of the housing and passes through the housing in an axial direction of the housing.

6. The electric motor of claim 5, further comprising a supporting rib that extends in the circumferential direction and surrounds the outer circumferential surface of the stator assembly, the supporting rib connecting the plurality of supporting portions to one another,
   wherein the bypass flow path is defined between the inner circumferential surface of the housing and an outer circumferential surface of the supporting rib.

7. The electric motor of claim 1, wherein the bypass flow path has a ring shape, an arcuate shape, or a polygonal shape.

8. The electric motor of claim 5, wherein the bypass flow path is one of a plurality of bypass flow paths that are defined inside the housing and that are spaced apart from one another by equal intervals in the circumferential direction of the housing.

9. The electric motor of claim 8, wherein a circumferential length of one of the plurality of bypass flow paths is greater than (i) a radial width of the one of the plurality of bypass flow paths and (ii) a circumferential length of one of the plurality of supporting portions.

10. The electric motor of claim 1, wherein the housing comprises:
    a first accommodating part that accommodates the rotor assembly and the stator assembly; and
    a second accommodating part that accommodates the impeller, the second accommodating part being disposed at a downstream side relative to the first accommodating part in a flowing direction of the air, and
    wherein the bypass flow path is defined between an inner circumferential surface of the first accommodating part and an outer circumferential surface of the stator assembly.

11. The electric motor of claim 1, wherein the housing comprises:
    a first accommodating part that accommodates the rotor assembly and the stator assembly;
    a second accommodating part that accommodates the impeller, the second accommodating part being disposed at a downstream side relative to the first accommodating part in a flowing direction of the air;
    a neck part disposed between the first accommodating part and the second accommodating part, a diameter of the neck part being less than a diameter of the first accommodating part; and
    an inclined part that is inclined with respect to an axial direction of the housing and extends from the first accommodating part to the neck part, and
    wherein the bypass flow path is defined between an inner circumferential surface of the first accommodating part and an outer circumferential surface of the stator assembly.

12. The electric motor of claim 1, wherein:
the rotating shaft is rotatably disposed at a central portion of the housing;
the first bearing supports a first end portion of the rotating shaft;
the second bearing supports a second end portion of the rotating shaft;
the impeller is rotatably coupled to the rotating shaft and covers the second bearing, the impeller being disposed at a downstream side relative to the permanent magnet in a flowing direction of the air; and
the rotating shaft comprises an impeller mounting portion that supports the impeller and that is disposed between the first bearing and the second bearing.

13. The electric motor of claim 1, wherein the housing comprises:
a first accommodating part that accommodates the rotor assembly and the stator assembly;
a second accommodating part that accommodates the impeller, the second accommodating part being disposed at a downstream side relative to the first accommodating part in a flowing direction of the air; and
an intake part disposed at an upstream side relative to the first accommodating part in the flowing direction of the air, the intake part defining a plurality of side holes that are in fluid communication with an outside of the housing and that are configured to introduce the air from the outside of the housing into the stator assembly, and
wherein the bypass flow path is in fluid communication with the plurality of side holes.

14. The electric motor of claim 1, wherein the stator assembly comprises:
a back yoke having a circular ring shape, the back yoke being disposed between the bypass flow path and the inner flow path;
a plurality of teeth disposed at an inner circumferential surface of the back yoke; and
a plurality of stator coils wound around the plurality of teeth, respectively,
wherein the inner flow path extends through an inside of the back yoke in an axial direction, and
wherein the bypass flow path is defined between an inner circumferential surface of the housing and an outer circumferential surface of the back yoke, the bypass flow path extending in the axial direction.

15. The electric motor of claim 1,
where the impeller is disposed between the first bearing and the second bearing, and
wherein the second housing cover accommodates the second bearing.

16. The electric motor of claim 1, wherein the first housing cover comprises:
an outer ring portion;
a first bearing accommodating portion that is disposed at an inner central portion of the outer ring portion and accommodates the first bearing; and
a plurality of connecting portions that connect the outer ring portion to the first bearing accommodating portion, the plurality of connecting portions extending radially from an inner circumferential surface of the outer ring portion to an outer circumferential surface of the first bearing accommodating portion,
wherein the plurality of connecting portions are spaced apart from one another in a circumferential direction and define a plurality of axial through-holes therebetween, the plurality of axial through-holes extending in an axial direction, and
wherein the bypass flow path overlaps with the plurality of axial through-holes along the axial direction and is in fluid communication with the plurality of axial through-holes in the axial direction.

17. The electric motor of claim 15, wherein the second housing cover further comprises
a second bearing accommodating portion that protrudes toward the impeller and accommodates the second bearing.

18. The electric motor of claim 17, wherein the inner hub is a first inner hub of the second housing cover, and the plurality of vanes are a plurality of first vanes of the second housing cover, and
wherein the second housing cover further comprises:
a second inner hub accommodated inside the outer cover, the first inner hub and the second inner hub being arranged along an axial direction; and
a plurality of second vanes that protrude spirally from an outer circumferential surface of the second inner hub toward the inner circumferential surface of the outer cover.

19. An electric motor comprising:
a housing;
a stator assembly disposed in the housing;
a rotor assembly rotatably disposed in the stator assembly;
an impeller configured to be rotated by the rotor assembly and to generate a flow of air;
a first bearing and a second bearing that are spaced apart from each other, the impeller being disposed between the first bearing and the second bearing;
a first housing cover that is disposed at a first side of the housing and accommodates the first bearing therein;
a second housing cover that is disposed at a second side of the housing and accommodates the second bearing,
wherein the stator assembly defines an inner flow path configured to guide a part of the air to pass through an inside of the stator assembly, and
wherein the housing defines a bypass flow path at an outside of the stator assembly, the bypass flow path being configured to guide another part of the air to bypass the stator assembly,
wherein the housing comprises:
a first flange that protrudes outward from the second side of the housing in a radial direction; and
a second flange that protrudes outward from a side of the second housing cover in the radial direction, the side of the second housing cover facing the second side of the housing in an axial direction, and
wherein the first flange overlaps with the second flange along the axial direction and is coupled to the second flange.

20. The electric motor of claim 16, further comprising an inverter configured to control a speed of the electric motor, the inverter comprising:
an insulated-gate bipolar transistor (IGBT);
a capacitor;
a Printed Circuit Board (PCB) that supports the IGBT and the capacitor thereon, the PCB being spaced apart from the first housing cover in the axial direction, wherein the first housing cover comprises a plurality of first coupling portions that protrude from the outer ring portion toward the PCB; and
a plurality of second coupling portions that protrude from an edge portion of the PCB toward the plurality of first coupling portions, respectively, each of the plurality of second coupling portions being coupled to one of the plurality of first coupling portions,
wherein the PCB and the first housing cover define a plurality of lateral flow paths therebetween, the plurality of lateral flow paths being defined between the plurality of second coupling portions and configured to introduce the air in a radial direction, and
wherein the plurality of lateral flow paths are in fluid communication with the plurality of axial through-holes.

\* \* \* \* \*